US011657307B1

(12) United States Patent
Bodapati et al.

(10) Patent No.: US 11,657,307 B1
(45) Date of Patent: May 23, 2023

(54) DATA LAKE-BASED TEXT GENERATION AND DATA AUGMENTATION FOR MACHINE LEARNING TRAINING

(71) Applicant: Amazon Technologies, Inc., Seattle, WA (US)

(72) Inventors: Sravan Babu Bodapati, Bellevue, WA (US); Rishita Rajal Anubhai, Seattle, WA (US); Georgiana Dinu, New York, NY (US); Yaser Al-Onaizan, Cortlandt Manor, NY (US)

(73) Assignee: Amazon Technologies, Inc., Seattle, WA (US)

(*) Notice: Subject to any disclaimer, the term of this patent is extended or adjusted under 35 U.S.C. 154(b) by 681 days.

(21) Appl. No.: 16/697,747

(22) Filed: Nov. 27, 2019

(51) Int. Cl.
```
G06N 5/043      (2023.01)
G06N 20/00      (2019.01)
G06F 40/20      (2020.01)
G06V 30/40      (2022.01)
G06F 18/22      (2023.01)
G06F 18/214     (2023.01)
```

(52) U.S. Cl.
CPC ............ *G06N 5/043* (2013.01); *G06F 18/22* (2023.01); *G06F 40/20* (2020.01); *G06N 20/00* (2019.01); *G06V 30/40* (2022.01); *G06F 18/214* (2023.01)

(58) Field of Classification Search
CPC .. G06K 9/6269; G06K 9/6273; G06K 9/6277; G06N 20/10; G06N 3/0454; G06N 3/0472; G06N 3/0481; G06N 3/08; G06V 10/82; G06V 20/41; G06V 20/46; G06V 40/15; G06V 40/161; G06V 40/169; G06V 40/40; G06V 40/45

See application file for complete search history.

(56) References Cited

U.S. PATENT DOCUMENTS

| | | | |
|---|---|---|---|
| 2010/0238919 A1* | 9/2010 | Froelich | H04M 7/0024 370/352 |
| 2018/0197105 A1* | 7/2018 | Luo | G06F 16/355 |
| 2019/0073348 A1* | 3/2019 | Cheesman | G06V 30/412 |

OTHER PUBLICATIONS

Jul. 28, 2019, Exploring Pre-trained Language Models for Event Extraction and Generation, Yang (Year: 2019).*
Jul. 28, 2019, Exploring Pre-trained Language Models for Event Extraction and Generation) (Year: 2019).*
"Cloze test"; Wikipedia; downloaded from https://en.wikipedia.org/wiki/Cloze_test on Nov. 27, 2019, 3 pages.

(Continued)

*Primary Examiner* — Ming Wu
(74) *Attorney, Agent, or Firm* — Nicholson De Vos Webster & Elliott LLP

(57) ABSTRACT

Techniques for data lake-based text generation and data augmentation for machine learning training are described. A user-provided dataset including documents and corresponding label information can be automatically supplemented by creating additional high-quality document samples, with labels, via a large repository of documents in a data lake. Documents from the data lake may be identified as being semantically similar to the user-provided documents but different enough to allow a resulting model to learn from the variation in these documents. New documents can be generated from user-provided document samples or data lake sample documents by identifying and replacing slots within the samples and rewriting adjunct tokens.

20 Claims, 10 Drawing Sheets

(56) References Cited

OTHER PUBLICATIONS

Yang, Sen et al.; "Exploring Pre-trained Language Models for Event Extraction and Generation"; Proceedings of the 57th Annual Meeting of the Association for Computational Linguistics, 2019, 11 pages.

* cited by examiner

US 11,657,307 B1

DATA LAKE-BASED TEXT GENERATION AND DATA AUGMENTATION FOR MACHINE LEARNING TRAINING

BACKGROUND

Modern systems utilizing machine learning (ML) for text-based processing often train specialized ML models to perform particular tasks in particular problem domains. For example, a user may wish to classify or detect particular entities present within textual data such as customer emails, support tickets, product reviews, call center conversation logs, social media posts, etc. Although some general-purpose language processing ML models trained on data from multiple domains may be used with varying degrees of efficacy, it is more effective to train a "custom" model for a particular usage scenario.

However, the types of ML models—such as deep learning models like neural networks that are the state of the art—are extremely data hungry, meaning they require huge amounts of labeled training data and/or unlabeled data for training. However, acquiring such data is extremely difficult in practice, as training data might be very hard to obtain for sensitive cases (e.g., medical or financial text records), extremely labor intensive, be of generally low quality due to discrepancies in label-application by annotators, etc. Even though certain developments in the field, such as the advent of transfer learning and semi-supervised learning, may reduce the need for as much training data, it remains the case that ML models trained with a large amount of high-quality, domain-specific samples nearly always out-perform ML models trained without this type and amount of training data.

BRIEF DESCRIPTION OF DRAWINGS

Various embodiments in accordance with the present disclosure will be described with reference to the drawings, in which.

DETAILED DESCRIPTION

The present disclosure relates to methods, apparatus, systems, and non-transitory computer-readable storage media for data lake-based text generation and data augmentation for machine learning (ML) training. According to some embodiments, a language processing service may utilize a large repository of textual data, such as that within a data lake that was acquired from a variety of sources, to expand the amount of training data that can be used for training a ML model in a useful manner while generating new training samples from scratch or by augmenting user-provided samples. Embodiments can generate new training samples in an efficient and effective manner by ensuring that new samples remain semantically similar to user-provided samples, while also ensuring that new samples remain different enough from user-provided samples to avoid overfitting the trained model, enabling the model to instead increase its understanding through learning from a variety of semantically similar, yet somewhat different, samples. Accordingly, embodiments disclosed herein can allow a user to train a high-quality custom ML model, such as one for classification or entity detection, with a relatively minimal number of user-provided samples from which to learn from.

Figure 1:
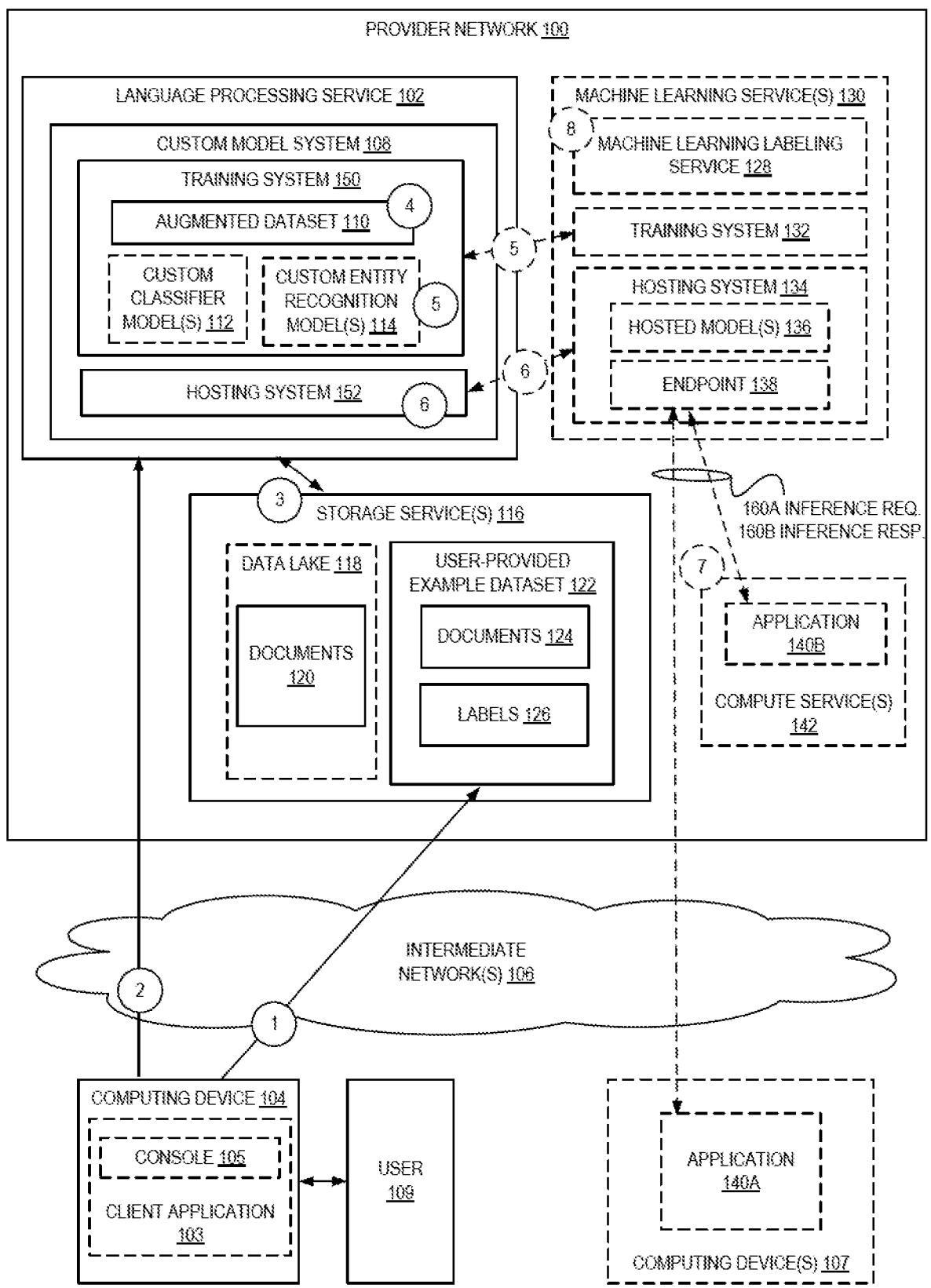
FIG. 1 is a diagram illustrating an environment for data lake-based text generation and data augmentation for machine learning training according to some embodiments.

FIG. 1 is a diagram illustrating an environment for data lake-based text generation and data augmentation for machine learning training according to some embodiments. FIG. 1 includes a language processing service 102, one or more storage services 116, one or more machine learning services 130, and one or more compute services 142 implemented within a multi-tenant provider network 100. Each of the language processing service 102, one or more storage services 116, one or more machine learning services 130, and one or more compute services 142 may be implemented via software, hardware, or a combination of both, and may be implemented in a distributed manner using multiple different computing devices.

A provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances or a serverless code execution service that executes code (either of which may be referred to herein as a compute service 142), a storage service 116 that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internal via one or more interface(s), such as through use of application programming interface (API) calls, via a console 105 implemented as a website or application, etc. The interface(s) may be part of, or serve as a front-end to, a control plane of the provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

For example, in various embodiments, a "serverless" function may include code provided by a user or other entity—such as the provider network itself—that can be executed on demand Serverless functions may be maintained within provider network 100 by an on-demand code execution service (which may be one of compute service(s) 142) and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute instance, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions (e.g., as an application 140B) that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time.

The language processing service 102, in some embodiments, is a machine learning powered service that makes it easy for users to understand, find insights in, and identify relationships in text. For example, users may use the language processing service 102 to analyze text-based content such as customer emails, support tickets, product reviews, call center conversations, social media posts, etc., which contain useful information but are typically unstructured and messy, making it challenging for users to independently extract relevant and meaningful insights at scale. The language processing service 102, in some embodiments, can address this problem using natural language processing (NLP) techniques to automatically identify the language of the text, extract key phrases, places, people, brands, or events; understand positive or negative sentiment; and/or automatically organize a collection of text files by topic. In some embodiments, the language processing service 102— via use of a custom model system 108—allows users to build and use models to detect a custom set of entities from text (e.g., via a custom entity recognition model 114) and/or classify this text in a manner that is tailored uniquely to the user's needs (e.g., via a custom classifier model 112).

The custom model system 108, for example, may enable users to generate a custom entity recognition model 114 that allows the language processing service 102 to identify terms that are specific to the user's domain. The custom model system 108 obtain, from a user 109, a relatively small private index of examples (for example, a list of policy numbers and text in which they are used), and then train a private custom entity recognition model 114 to recognize these terms in any other block of text, without requiring the user 109 to manage servers, implement particular algorithms, etc. For example, a user 109 working at an insurance company may wish to analyze text documents for an entity specific to their business—policy numbers. Given an example text snippet (e.g., from a chat or phone transcript) of "Hi, my name is Sam Ford and I am filing a claim for car accident. My policy code is 456-YQT", the custom entity recognition model 114 may identify an entity that is "456-YQT", identify the category of the entity (e.g., "Policy_ID"), a count indicating a number of times that entity appeared in the document (e.g., "1"), and a confidence value that the identified text does belong to that category (e.g., 0.95 of a maximum 1.00).

The custom model system 108, for example, may additionally or alternatively enable users to build custom text custom classifier model(s) 112 using their domain (or business) specific labels without needing to manage servers, understand ML techniques, etc. For example, a user 109 developing for a customer support organization can use the custom model system 108 to train a custom classifier model 112 to automatically categorize inbound requests by problem type based on how a customer has described an issue. The user 109 may provide examples of text for each of the labels they want to use, and the custom model system 108 trains a custom classifier model 112 on those samples. With a custom classifier model 112, users may thus easily perform sophisticated ML-backed tasks including but not limited to moderating website comments, triaging customer feedback, organizing workgroup documents, etc. For example, a user may wish to organize customer support feedback at an airline company into one of the following categories or classes: account questions, ticket refunds, and flight complaints. Given an example text snippet (e.g., from a chat or phone transcript) of "Hi, I wanted to report a problem on my last flight", the custom classifier model 112 may identify that this text has a label of "flight complaint" with a particular confidence score (e.g., 0.92 out of a maximum 1.00).

Thus, a user 109 may provide or otherwise identify a dataset 122 for use in creating a custom model. For example, as shown at circle (1), the user 109 may utilize a client application 103 executed by a computing device 104 (e.g., a web-application implementing a console 105 for the provider network 100, a standalone application, another web-application of another entity that utilizes the language processing service 102 as a part of its backend, a database or mixed-SQL environment, etc.) to cause the computing device 104 to upload the dataset 122 to a storage location (e.g., provided by a storage service 166 such as an object storage service of a provider network 100).

The dataset 122 may be a columnar dataset that includes rows (or entries) of data values, where the data values may be arranged according to one or more columns (or attributes) and may be of a same datatype (e.g., one storing text). In some cases, the dataset 122 may include headings or other metadata describing names or datatypes of the columns, though in some cases this metadata may not exist. For example, some or all of the dataset 122 may have been provided by a user as a plaintext file (e.g., a comma-separated values (CSV) or tab-separated values (TSV) file), an exported database table or structure, an application-specific file such as a spreadsheet, etc.

For example, when a user 109 desires to train a custom classifier model 112, this file (or files) may be a CSV with at least two values per row—e.g., one column storing documents 124 (e.g., an amount of text ranging from a few characters to many words, sentences, paragraphs, etc.), and another column storing labels 126 corresponding to the documents—e.g., "label, Text of document 1", where a label could be a valid UTF-8 string corresponding to a desired class to be detected.

As another example, when a user 109 desires to train a custom entity recognition model 114, this file (or files) may include a first file providing documents 124 with each document on its own line, and a second corresponding file (e.g., CSV) providing labels 126 having one or more of the following columns: a "file identifier" (e.g., the name of the file containing the document), a "line identifier" (e.g., the line number containing the entity, starting with line 0), a "begin offset" identifier (e.g., the character offset in the input text (relative to the beginning of the line) that shows where the entity begins, where the first character is at position 0), an "end offset" identifier (e.g., the character offset in the input text that shows where the entity ends), and/or a "type" identifier (e.g., the user-defined entity type, such as MANAGER or ENGINEER).

Alternatively or additionally, when a user 109 desires to train a custom entity recognition model 114, this file (or files) may include may include a first file providing documents 124 with each document on its own line, and a second corresponding file (e.g., CSV) providing labels 126 where the labels are indicated in a first column with the corresponding entity type in a second column—e.g., "Jane Smith, MANAGER"—and the custom model system 108 may then search through the documents to find the occurrences of the labels and the locations thereof.

Thereafter, at circle (2) the computing device 104 may issue one or more requests (e.g., API calls) to the language processing service 102 that indicate the user's 109 desire to train a custom classifier model 112 or custom entity recognition model 114. The request may be of a type that identifies which type of model is to be created—e.g., CreateDocumentClassifier for creating a custom classifier model 112, CreateEntityRecognizer for creating a custom entity recognition model 114, etc. The request may also include one or more of an identifier of a storage location or locations storing the dataset 122 (e.g., an identifier of just the documents 124, an identifier of just the labels 126, an identifier associated with both the documents and labels, etc), which may identify a storage location (e.g., via a Uniform Resource Locator (URL), a bucket/folder identifier, etc.) within the provider network 100 (e.g., as offered by a storage service 116) or external to the provider network 100, a format identifier of the dataset 122, a language identifier of the language of the dataset 122 documents 124, etc. In some embodiments, the request includes the labels 126 themselves within the request, e.g., as part of an entity list for a custom entity recognition model 114.

Responsive to receipt of the request, the custom model system 108 of the language processing service 102 is invoked and begins operations for training the corresponding type of model. For example, the custom model system 108 may identify what type of model is to be trained (e.g., via analyzing the method call associated with the request), the storage location(s) associated with the dataset 122, etc. Thus, the custom model system 108 may retrieve any stored dataset 122 elements as shown at circle (3), which may be from a storage location within the provider network 100 or external to the provider network 100.

As indicated herein, it is often the case that the performance of a custom model can be substantially improved when large amounts of high-quality training data are used (e.g., tens of thousands of labeled samples or more), while at the same time users 109 often do not have easy access to such significant amounts of data. Accordingly, the custom model system 108 in some embodiments supplements the user-provided example dataset 122 by generating potentially many additional, high-quality documents with corresponding high-quality labels to yield an augmented dataset 110 (at circle (4)) that can be used for training the custom classifier model 112 or custom entity recognition model 114 (by the training system 150 at circle (5)), which thereafter can be hosted (by the hosting system 152 at circle (6)) and used for synchronous (e.g., real-time) and/or asynchronous (e.g., batch) inference. In some embodiments, the training of the custom classifier model 112 or custom entity recognition model 114 may include use of a separate training system 132 of a machine learning service 130 described later herein to perform a particular training job or hyperparameter optimization tuning job, or the like; similarly, the hosting system 152 of the custom model system 108 may make use of a hosting system 134 of a machine learning service 130 to deploy a model as a hosted model 136 in association with an endpoint 138 that can receive inference requests from client applications 140A and/or 140B at circle (7), provide the inference requests 160A to the associated hosted model(s) 136, and provide inference results 160B (e.g., predicted classes, predicted entities) back to applications 140A and/or 140B, which may be executed by one or more computing devices 107 outside of the provider network 100 or by one or more computing devices of a compute service 142 (e.g., hardware virtualization service, serverless code execution service, etc.) within the provider network 100.

In some embodiments, the custom model system 108 may further use a machine learning labeling service 128, as reflected by optional circle (8), that may use automated and/or manual annotators to verify and/or provide labels/annotations for documents created for the augmented dataset 110.

This generation of additional documents and labels, in some embodiments, is based on both the user-provided dataset 122 as well as a large corpus (or informal repository) of text documents 120, which may be stored as a data lake 118. These text documents 120 may come from a variety of sources, including but not limited to publicly available information, books, encyclopedias, newspapers, journals, social media systems, and the like. The training system 150 may identify particularly useful samples from within this data lake 118 and modify them and/or use them directly as additional samples within the augmented dataset 110. In this manner, with a relatively small number of user-provided dataset 116 sample documents (e.g., a few thousand or fewer), the training system 150 can boost this dataset into an augmented dataset 110 with potentially many more useful samples, such as thousands, tens of thousands, hundreds of thousands, millions, or more document samples with labels. Moreover, embodiments can ensure that the "new" samples remain semantically similar to the user-provided dataset 122 and also include samples that are different enough from these user-provided dataset 122 samples to allow the resultant models to be able to learn from them, avoiding overfitting and the resultant poor accuracy typically with trainings using small amounts of samples or too-similar samples.

To generate the augmented dataset 110 based on the user-provided dataset 122 and the data lake 118, the custom model system 108 may use one or more of a variety of techniques. One such set of techniques is presented with regard to FIG. 2, which is a flow diagram illustrating operations 200 of a method for a language modeling approach to data lake-based text generation and data augmentation for machine learning training according to some embodiments. Some or all of the operations 200 are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 200 are performed by the custom model system 108 and/or other components of a provider network 100 of FIG. 1.

This set of operations 200, in some embodiments, provides a language modeling-based approach for generating a custom classifier model 112 responsive to a request to create a document classifier. This approach allows for newly created samples to be semantically similar to the samples (documents 124) provided by the user but yet be different enough so that the resultant model can generalize. For example, this combination can allow for semantically similar but different documents "I like pizza" and "She really enjoys pizza" to be used while preventing a document "I like that pizza cutter" from being included as it does not semantically carry the same or similar meaning.

At block 202, the operations 200 include obtaining a "repository" (here meaning an informal or formal collection) of documents, e.g., from a data lake. The documents may have been collected from one or multiple sources and may include documents from one or multiple domains. For example, the repository may include lines, paragraphs, or articles from an encyclopedia, articles from one or more newspapers, magazines, journals, websites, etc., transcriptions from audio and/or audiovisual recordings, etc. Thus, block 202 may include one or both of obtaining documents and storing them as the repository (e.g., as part of a data lake), and/or obtaining documents from the data lake, such as via sending requests to read or download one or more of the documents.

With this information, a general-purpose natural language processing ML model is trained (or obtained, such as by downloading or accessing a previously-trained ML model) at block 204, e.g., which may be a model based on ELMo (Embeddings from Language Models), BERT (Bidirectional Encoder Representations from Transformers), OpenAI GPT/GPT-2, etc.

Similarly, at block 206, user-provided document samples are obtained. Block 206 may include one or both of receiving the document samples from a computing device of the user and storing these document samples, and/or obtaining the document samples from a storage location, such as via sending one or more requests to read or download the document samples. Using these user-provided samples, which are typically far fewer in number compared to the documents in the data lake, a "custom" ML model (e.g., another natural language processing model) is trained at block 208, which may include training a model using only these user-provided samples, retraining a pre-trained model using these user-provided samples, etc.

Thus, with a general-purpose ML model and a custom model, a candidate set of "new" document samples is generated at block 210. In some embodiments, block 210 includes blocks 212-220 as shown, though in other embodiments more, fewer, and/or different sub-blocks may be utilized.

At block 212, a document is selected from the data lake according to some technique, e.g., based on random selection. At block 214 and block 216, each document is "scored" by use of the general-purpose model and the custom model to determine the "perplexity" of the document from the perspective of each model. As is known to those of skill in the art of natural language processing, perplexity is a measurement of how well a probability model predicts a sample, and in the context of NLP, perplexity is commonly one way to evaluate language models. In this case, the perplexities generated by the different models in blocks 214, 216, can be compared to determine a difference between these perplexity values at block 218. For example, the difference could be set to the value of the generic model's perplexity—the custom model's perplexity, both for the same document. This process may repeat back to block 212 a number of times, e.g., a thousand times, one-hundred thousand times, etc.

At block 220, then, a set of these documents may be selected for inclusion in the candidate set based on these generated perplexity differences. In some embodiments, block 220 includes identifying some threshold number of the documents having the highest/largest difference in perplexity, though in other embodiments block 220 includes identifying all documents having a difference in perplexity that is higher than some threshold value (e.g., preconfigured based on a heuristic, determined based on a statistical analysis of all perplexity difference values, etc.).

Notably, by selecting those documents having a largest difference in perplexity, documents are identified that the custom model finds quite perplexing, but the general-purpose model does not find perplexing (e.g., so it looks to be a well-formed and/or common sentence), meaning the document would be different enough from what the custom model was trained on but not particularly odd from the perspective of the general-purpose model, which was trained on the repository at block 202.

A second phase may be performed via block 230 to filter the candidate set. In some embodiments, while the first phase performed via block 210 finds documents (as part of a candidate set) that are different from what the custom model has previously seen (with regard to what is in the user-provided document samples), the second phase can filter the candidate set to find documents that are semantically similar (e.g., carry a similar meaning) to the documents in the user-provided document samples.

For example, block 230 includes embedding the user-provided samples at block 231 into a latent space, sampling a pair of the user-provided samples at block 232, and computing a similarity (e.g., compute a cosine similarity, or another similar metric) between the samples at block 234. Another sampling and similarity computation may occur for some number of pairings (e.g., fifty times, all possible pairings, etc.). At block 236, a first similarity value (e.g., an average) based on the computed similarity values, which reflects a similarity of the user-provided document samples.

At block 238, the operations continue with embedding a document from the candidate set into the same latent space and computing a similarity value at block 240 between that embedding and a number of the embeddings derived from the user-provided samples, which could include computing a similarity between the embedding and each of one or more of the other user-provided sample embeddings. At block 242, a second similarity value is computed, e.g., as an average of the similarities computed in block 240. At decision block 244, a determination is made as to whether the second similarity value is within a threshold amount of the first similarity value—if so, the document is retained/included within the candidate set at block 246, but if not, the document is removed/discarded from the candidate set at block 248.

With regard to block 244, the second similarity value may be within the threshold when, for example, it is of the same or higher similarity than the first similarity value. Alternatively, in some embodiments the second similarity value may be within the threshold when, for example, it is within some distance of the first similarity value or greater than or equal to the first similarity value. As one example, the second similarity value may be determined to be within the threshold if it is no more than 0.2 less than the first similarity value—thus, a second similarity value of 0.55, 0.70, or 0.94 would all be within the threshold if the first similarity value is 0.70, but a second similarity value of 0.45 would not, and thus that sample would be discarded.

Thereafter, the operations include determining, at block 250, whether additional document samples are needed in the candidate set and/or determining whether there are additional documents within the candidate set that have not been evaluated, and if so, flow continues back to block 238. As part of block 250, determining that additional document samples are needed in the candidate set may include determining whether the candidate set has reached a particular defined or relative size (e.g., includes 1,000 documents, includes 4× the number of documents as the user-provided document set, etc.).

In some embodiments, it could potentially be the case that not enough candidates are found to satisfy a stopping condition. For example, if a defined number of samples are sought (e.g., 500) but due to the threshold configuration of block 244 that many samples from the candidate set are included per block 246, embodiments may address the issue by, for example, relaxing the thresholding of block 244 (e.g., in the example above, changing the threshold to be 0.3 or 0.5 instead of 0.2), going back to look for more documents to be included in the candidate set in block 210 (either from the existing repository of documents, or by performing operations to expand the size of the repository), and the like.

As a result, this two-phase set of operations including candidate set creation (block 210) and filtration (block 230) leads to a set of documents that are significantly different from documents in the user-provided set, yet these documents remain somewhat similar, providing high-quality data for model training.

Figure 3:
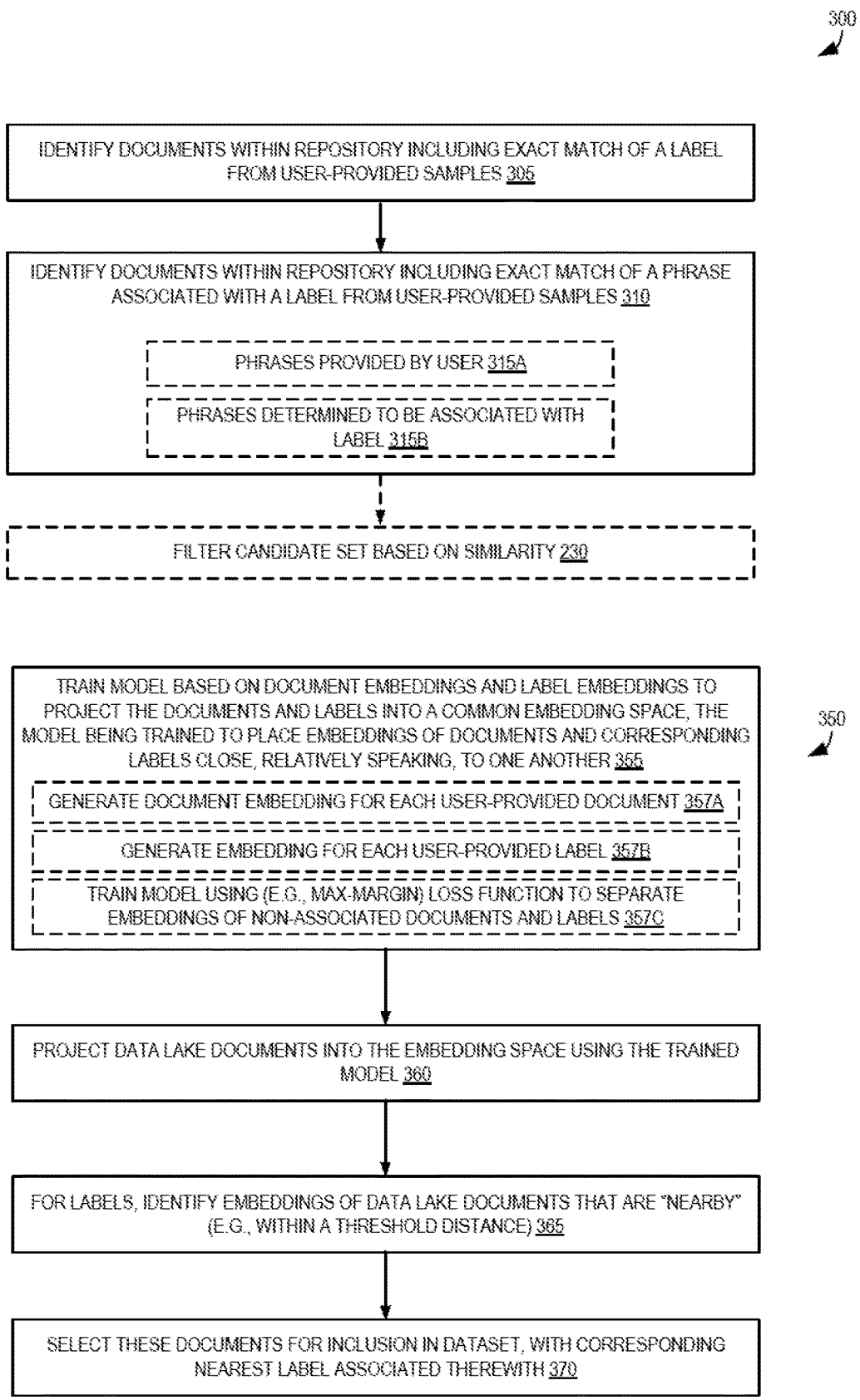
FIG. 3 depicts a flow diagram illustrating operations of a method for a label matching approach to data lake-based text generation and data augmentation for machine learning training and a flow diagram illustration operations of a method for an embedding-based approach to data lake-based text generation and data augmentation for machine learning training according to some embodiments.

Another set of techniques that may alternatively or additionally utilized is presented with regard to FIG. 3, which depicts a flow diagram illustrating operations 300 of a method for a label matching approach to data lake-based text generation and data augmentation for machine learning training and a flow diagram illustration operations 350 of a method for an embedding-based approach to data lake-based text generation and data augmentation for machine learning training according to some embodiments.

Some or all of the operations 300, 350 are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 300, 350 are performed by the training system 150 of the other figures. In some embodiments, both sets of operations 300, 350 may be used together to generate a larger training dataset using both techniques, though in other embodiments only one of the sets of operations 300, 350 is utilized.

The operations 300 are based on a concept of 'exact matching' of labels and/or tokens within a large data lake repository. As the documents in the data lake repository do not have labels corresponding to a particular user's task, the user's labels and/or documents can be utilized, with documents from the general data lake repository, to generate a larger set of documents for training.

The operations 300 may include, at block 305, identifying documents within the repository including an exact match of a label from a set of user-provided sample documents. Thus, one way to identify other documents as being related to a particular user-provided label is to perform a search, through the documents of the repository, to identify any documents including any of these labels (or derivations thereof, and/or synonyms thereof), and including these documents within the set of candidate documents. For example, if a user seeks to detect "angry" messages, the user may have provide a label indicating "angry" or "anger" and block 305 includes searching for documents within the repository that include the label (or common derivations thereof, such as synonyms or different versions of term). Each such found document may be tentatively associated with that label—e.g., "angry."

Additionally (or alternatively), the operations 300 may include, at block 310, identifying documents within repository including exact match of a phrase associated with a label from user-provided samples. In some embodiments, a user may provide or select—along with the documents and labels—lists of associated phrases that correspond to the labels. For example, if a user seeks to detect "angry" messages, the user may have a label indicating "angry" or "anger" and may provide or select (per block 315A), in association with this label, a set of phrases commonly associated with this concept—e.g., "absolutely not", "are you kidding", "don't make me laugh", "excuse me", "firstly", "for starters", "I beg your pardon", "pardon me", and the like. In some embodiments, as reflected by block 315B, the custom model system 108 may instead maintain a similar set of phrases associated with common concepts or may detect them dynamically based on identifying particular phrases within the user-provided documents having that label. Either way, block 310 may thereafter include searching through the repository of documents for documents that include any of these phrases, and designating such matching documents as being included in a candidate set of documents along with the corresponding label.

In some embodiments, the operations 300 further include the filtering of the candidate set based on similarity analysis as presented herein with regard to block 230, leading to an expanded dataset of documents with labels that can be used for training.

The second set of operations 350 shown involve the concept of matching label embeddings. Instead of directly searching within the text of the documents of the repository as used via operations 300, the operations 350 instead utilize document embedding techniques for the search.

The operations 350 include, at block 355, train a model based on document embeddings and label embeddings to project the documents and labels into a common embedding space, the model being trained to place embeddings of documents and corresponding labels close, relatively speaking, to one another. For example, in some embodiments, block 355 includes block 357A and generating a document embedding for each user-provided document. In some embodiments, block 357A comprises generating a word embedding for each word in the document, and consolidating all embeddings for that document (e.g., via an average), to create an embedding for the overall document. In some embodiments, block 355 includes block 357B and generating an embedding for each user-provided label, e.g., in a similar manner With these embeddings, block 355 may include, at block 357C, training a model using a loss function (e.g., a max-margin loss) to separate embeddings of non-associated documents and labels and consolidate the embeddings of associated documents and labels—e.g., the training data could be a combination of a user-provided document embedding, a user-provided label embedding, and an identifier (e.g., 0/1, T/F) of whether the document and label are associated.

The operations 350 include, at block 360, projecting one or more of the data lake documents into the embedding space (e.g., using the trained model, acting as an embedding generator), which may include selecting one or multiple data lake documents from the repository and using the trained model to generate an embedding for that document.

The operations 350 include, at block 365, identifying, for each of the user-provided labels, embeddings of data lake documents that are sufficiently "nearby" (e.g., within a threshold distance). At block 370, these documents are selected for inclusion in the expanded dataset, together with the corresponding label associated therewith.

In some embodiments, these operations 350 can be modified to extend the technique to operate in multilingual environments. For example, in some embodiments the data lake repository of documents may include documents from other languages, which similarly can be projected into a shared multilingual space, and these documents from other languages can be placed into a candidate set, for example, based on semantic similarity of labels. In some embodiments, the system can then, for example, fine-tune a multilingual model with documents in a target language, and/or translate documents in some language into a source language (e.g., English), and use these translated documents as additional training data.

Figure 2:
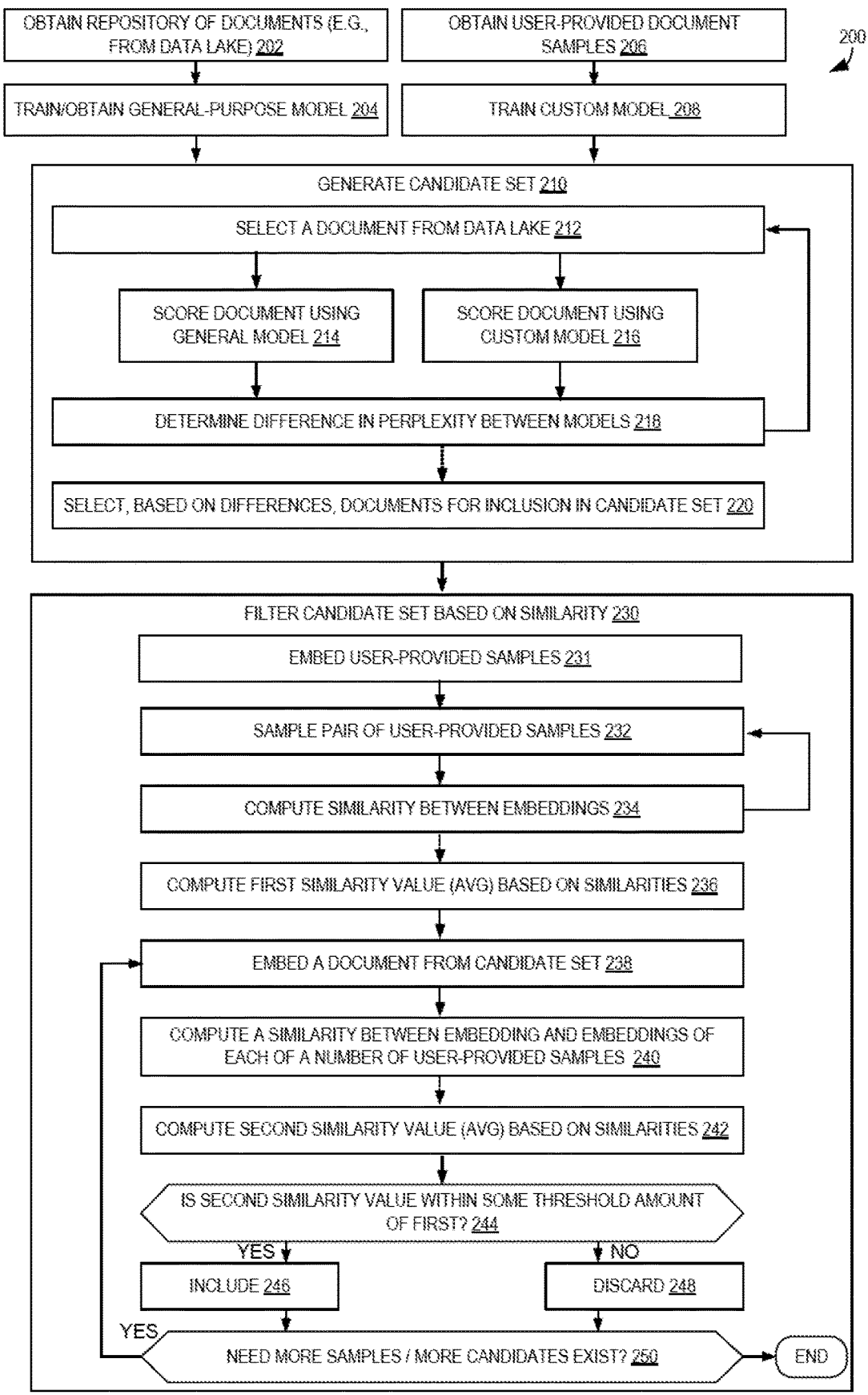
FIG. 2 is a flow diagram illustrating operations of a method for a language modeling approach to data lake-based text generation and data augmentation for machine learning training according to some embodiments.
Figure 4:
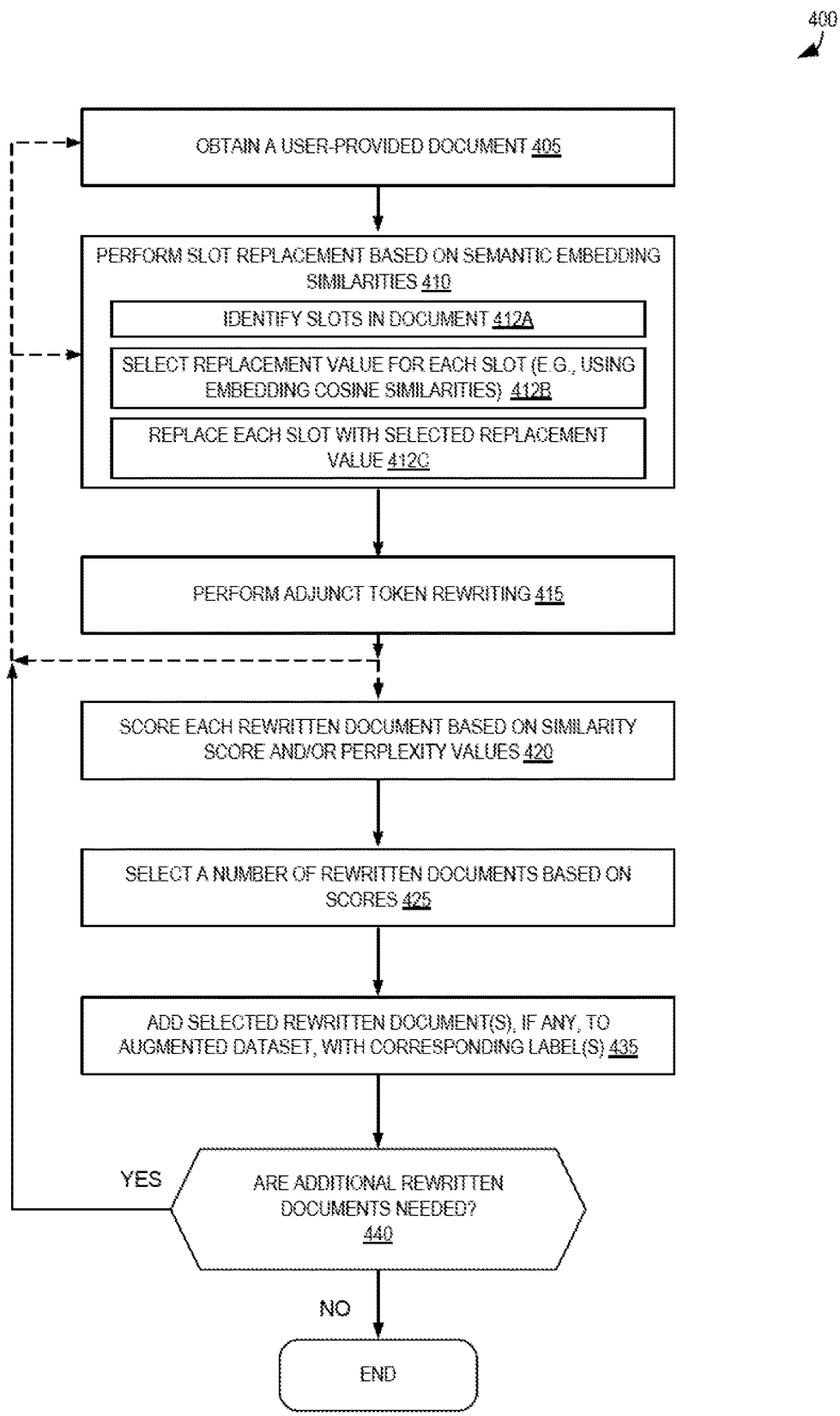
FIG. 4 is a flow diagram illustrating operations of a method for an augmentation-based approach to data lake-based text generation and data augmentation for machine learning training according to some embodiments.

As indicated above, the techniques presented with regard to FIGS. 2-3 are particularly well-suited to generating additional training data for training a custom classifier-type model. FIG. 4 is a flow diagram illustrating operations of a method for an augmentation-based approach to data lake-based text generation and data augmentation for machine learning training according to some embodiments. These operations 400 are particularly well-suited to generating additional training data for training a custom entity detection model.

Some or all of the operations 400 are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 400 are performed by the training system 150 of the other figures.

For training custom entity detection models, a user may provide both exemplary documents as well as entity information, which could be of a variety of forms. For example, a user may provide an identifier of an entity and identifiers of the span(s) (within the document) that correspond to the entity. For example, the document "Aaron Rodgers throws 350th career touchdown pass in Packers win" may include an identifier of the span (e.g., a starting and stopping character number, a starting character number with a length value, etc.) that includes "Aaron Rodgers", which may be of an entity type of "athlete", and an identifier of the span that includes "Packers", which may be of an entity type of "team". Additionally or alternatively, a user may provide exemplary documents with one or more entity lists, each corresponding to an entity type and including a list (or similar data structure) of particular phrases/tokens of that type—e.g., an entity list of "athlete" could include "Aaron Rodgers, LeBron James" while an entity list of "team" could include "Packers, Green Bay Packers, Lakers, Los Angeles Lakers", etc., and thus the training system 150 can create its own labels using the entity list(s) by identifying which entities exist within which provided document samples (e.g., via string matching techniques known to those of skill in the art) as well as the locations of these entities.

Accordingly, the operations 400 include, at block 405, obtaining a user-provided document, and at block 410 performing slot replacement based on semantic embedding similarities. Block 410 may include, for example, block 412A and identifying slots in the document, e.g., using a Named-entity recognition (NER) system known to those of skill in the art, and/or identifying entities from user-provided label information (e.g., entity lists, span information, etc.).

Block 410 may also include, for example, block 412B and selecting a replacement value for each slot. The selection may include identifying a similar value from a defined list of replacement values, e.g., by determining another "related" value having similar characteristics (e.g., similar characters, a similar entity, etc.). The selection, in some embodiments, may include using embedding distance-based techniques to embed both the phrase (of the slot) and other phrases (e.g., entities) into a common space based on semantic meaning, similar to as described earlier, and selecting a replacement phrase by finding a closest (or one relatively close) embedding from the "other" phrases to that of the phrase to-be-replaced. In some embodiments, a natural language type ML model (e.g., ELMo, BERT, etc.) may be used to obtain these embeddings. Block 410 may also include, at block 412C, replacing each slot with the selected replacement value.

In some embodiments, to avoid potential overfitting (of a later-to-be-trained model using this data for training) to carrier phrases where only the slot values have changed, adjunct token rewriting is also performed at block 415. For example, in some embodiments one or more "adjunct" tokens (or, non-slot text values) are replaced by masking one or more of these tokens and a natural language type model (e.g., BERT) is used to predict a vocabulary identifier of one or more suitable tokens based on the context, which can be used to replace the tokens. This process may occur over one or multiple rounds for a same document, where each round may include masking out some amount of tokens (e.g., a fixed number of tokens or a percentage of tokens, such as 15%) and using the ML model to predict what those values should be, resulting in likely new adjunct tokens. This process of generating additional rewritten documents can continue by beginning again with the same original user-provided document zero or more times (back at block 410), or by selecting another user-provided document (back at block 405).

At block 420, each rewritten document can be scored, e.g., based on the similarity score and/or perplexity value-based techniques disclosed herein with regard to FIG. 2. For example, a rewritten document can be scored by a general-purpose natural language model (as in block 214) and by a custom-trained model (e.g., based on the user-provided documents) to determine a perplexity difference between the perplexity reported by each model. Block 420 may also or alternatively include determining a similarity score indicating a similarity (or, the opposite distance) between the rewritten document and known documents (from the repository, and/or the user-provided examples) via their cosine similarities between the document embeddings similar to as described earlier herein.

At block 425, a number of the rewritten documents are selected for inclusion in the augmented dataset based on these scores. For example, a "top n" number of rewritten documents may be selected for inclusion, or a more complex rule or heuristic may be used, e.g., only documents satisfying a first threshold based on the perplexity difference and/or satisfying a second threshold based on the similarity values may be selected. Thus, depending upon the preferences of the implementor, it is possible for zero, one, many, or all of the rewritten documents to be selected for inclusion.

At block 435, the operations 400 include adding any selected rewritten document(s), if any, to the augmented dataset, along with corresponding label(s). Beneficially, due to the explicit knowledge of where the original labeled entities were, the locations of the replacements for these entities are similarly known and can be used as labels.

At decision block 440, a determination is made as to whether additional rewritten documents are needed; if so, flow may continue back to block 405 or 410. The determination may be made, for example, based on determining if a particular threshold amount of document samples have been generated so far. When a sufficient number of rewritten documents have been generated, this part of the process may end.

Figure 5:
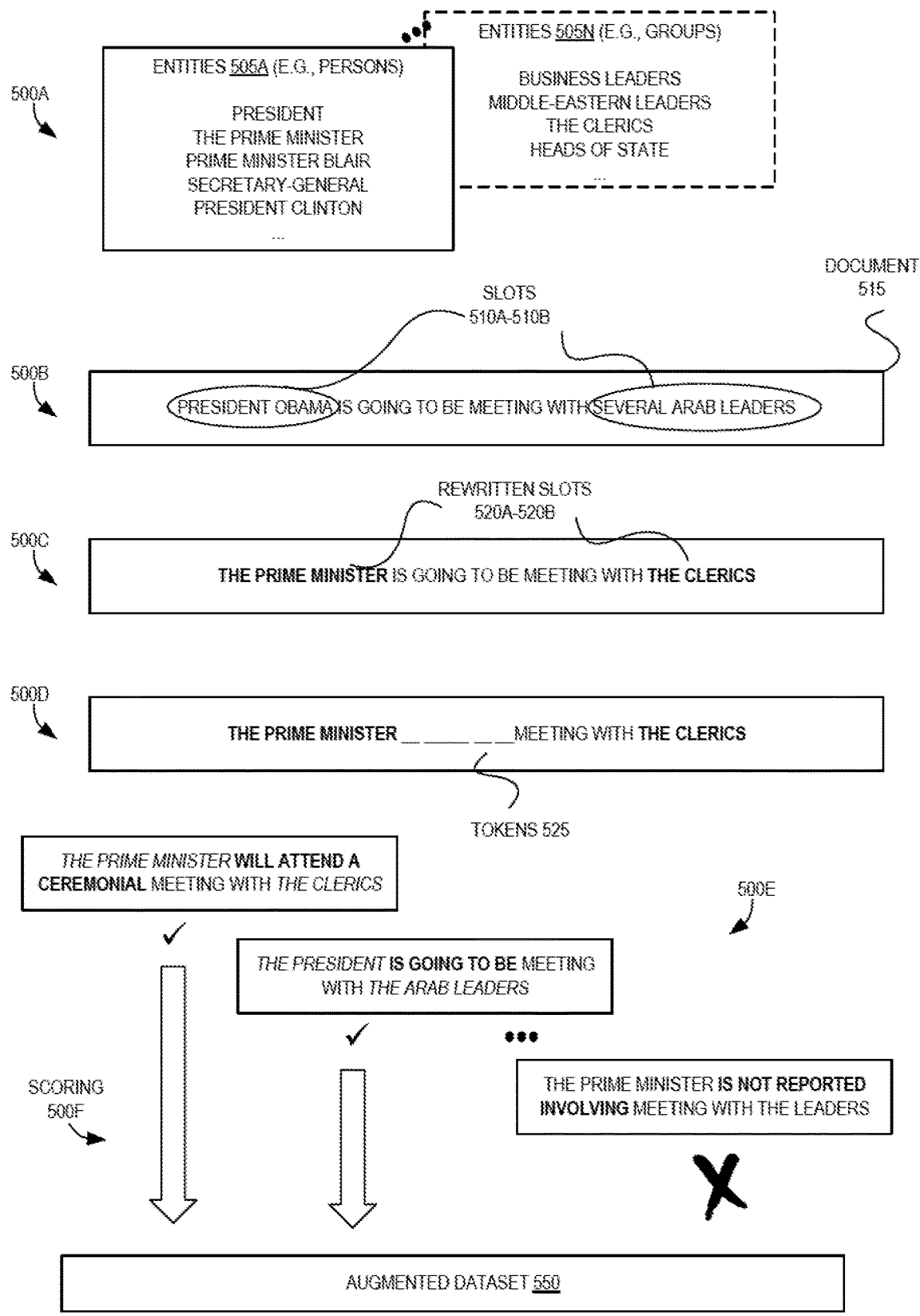
FIG. 5 is a diagram illustrating exemplary augmentation-based techniques for data lake-based text generation and data augmentation for machine learning training according to some embodiments.

For a more concrete example, FIG. 5 is a diagram illustrating exemplary augmentation-based techniques for data lake-based text generation and data augmentation for machine learning training according to some embodiments. In FIG. 5, a number of entity lists 505A-505N are shown at 500A, each corresponding to a type of entity—here shown as "persons" and "groups," though of course many other entity types may be used in varying embodiments.

At 500B, a selected document 515 is illustrated with a number of determined slots 510A-510B ("President Obama" and "Several Arab Leaders"), which may have been identified within label-related information provided by the user, identified using a NER-type model, etc. As described with regard to FIG. 4, these slot values may be replaced with semantically similar slot values, e.g., by selecting from entity lists 505A-505N (e.g., using embedding comparisons, textual/character comparisons, etc.), to result in a document shown at 500C with rewritten slots 520A-520B. At 500D, a number of adjunct tokens 525 are selected to be "masked", and in this example multiple different replacements are selected for these same tokens at 500E (e.g., via predicting slot values using a language model), though in other embodiments there may be additional rounds where the particular tokens 525 selected for replacement are changed, resulting in yet further, different rewritten documents. At 500F, these rewritten documents can be scored as described above using, for example perplexity scoring and/or semantic similarity scoring, which here allows a last document to be rejected from inclusion in the augmented dataset 550, potentially due to its improper grammar being observed via having high perplexity from both a generic model and/or a custom model.

Another technique for generating additional documents can make use of synthetic data generation. In some embodiments, user-provided documents 124 can be used to train a language model, such as a neural language model or Long Short-term Memory (LSTM) model, to be able to generate synthetic documents that are similar to the user-provided documents. Neural language models, which are also referred to as continuous space language models, apply neural networks using continuous representations or embeddings of words to make their predictions; however, other types of language models can be similarly utilized. In some embodiments, this synthetic generation technique can be used to generate additional candidate samples that can be tested for inclusion in the augmented dataset 110 (or, filtered) as described herein, e.g., using embedding similarity and/or perplexity-based analysis. In some embodiments, this generation of synthetic data may be used if other techniques described herein (e.g., with regard to FIGS. 2-4) are unable to generate a sufficient number of documents for a complete augmented set.

Figure 6:
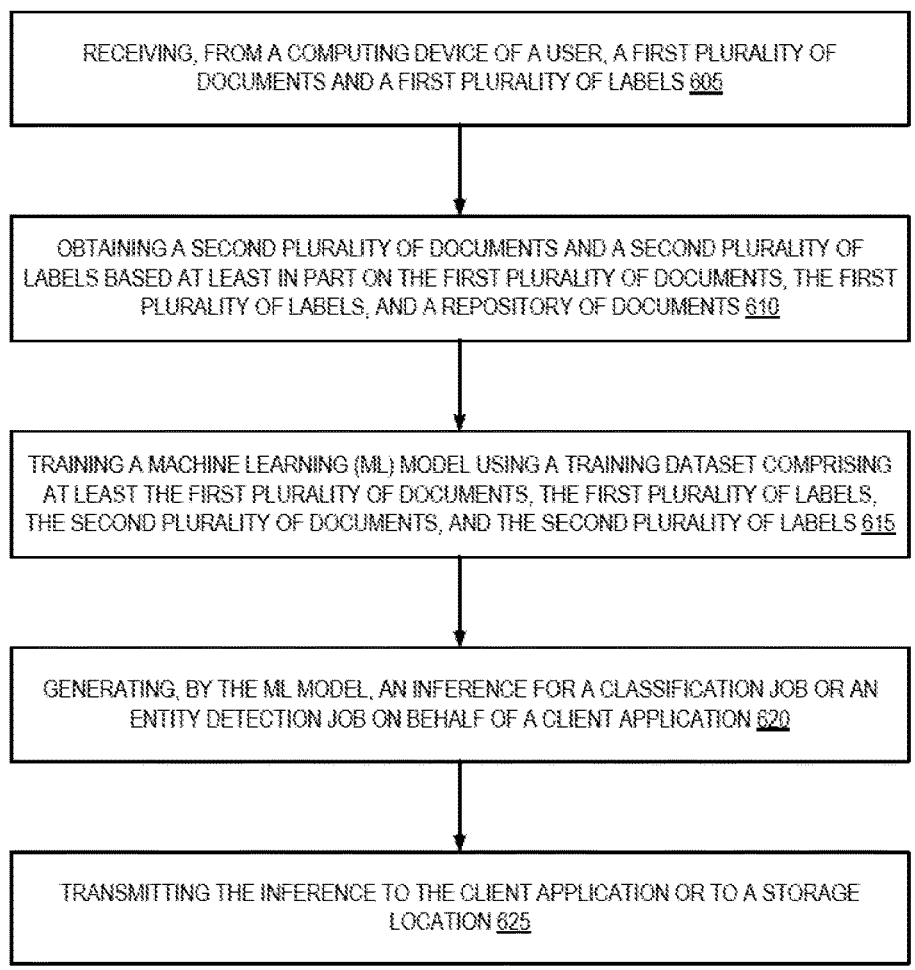
FIG. 6 is a flow diagram illustrating operations of a method for data lake-based text generation and data augmentation for machine learning training according to some embodiments.

FIG. 6 is a flow diagram illustrating operations of a method for data lake-based text generation and data augmentation for machine learning training according to some embodiments. Some or all of the operations 600 are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 600 are performed by the custom model system 108 and/or provider network 100 of the other figures.

The operations 600 include, at block 605, receiving, from a computing device of a user, a first plurality of documents and a first plurality of labels. The receipt may occur at an endpoint of a provider network that is associated with a storage service, which stores the first plurality of documents and the first plurality of labels at one or more storage locations within the provider network.

The operations 600 further include, at block 610, obtaining a second plurality of documents and a second plurality of labels based at least in part on the first plurality of documents, the first plurality of labels, and a repository of documents. In some embodiments, at least one document of the second plurality of documents does not exist within both the first plurality of documents and the repository of documents.

In some embodiments, block 610 comprises: identifying, within the repository of documents, a document either including a first of the first plurality of labels that corresponds to a first document of the first plurality of documents or having a corresponding label that is the same as the first label, wherein the document and the first document belong to different domains; and including the document within the second plurality of documents.

In some embodiments, block 610 comprises: projecting a plurality of documents of the repository of documents into a common embedding space with a corresponding plurality of labels; projecting at least the first plurality of labels into the common embedding space; and selecting one or more of the plurality of documents based on an analysis of embeddings within the common embedding space.

In some embodiments, block 610 comprises: replacing at least a first value at a slot within a document of the first plurality of documents with a second value based at least in part on a semantic similarity between embeddings of the first value and second value, wherein the first slot corresponds to a label of the first plurality of labels; replacing one or more other values within the document, yielding a rewritten document; and determining that the rewritten document and at least the label are to be included within the second plurality of documents and the second plurality of labels, respectively, based on an analysis of the rewritten document.

In some embodiments, block 610 comprises: sending ones of the second plurality of documents to one or more annotators to solicit a selection, by the one or more annotators, of whether the corresponding document is associated with one or more of the first plurality of labels; and receiving, from the one or more annotators, annotations indicating the second plurality of labels for the second plurality of documents.

The operations 600 further include, at block 615, training a machine learning (ML) model using a training dataset comprising at least the first plurality of documents, the first plurality of labels, the second plurality of documents, and the second plurality of labels.

The operations 600 further include, at block 620, generating, by the ML model, an inference for a classification job or an entity detection job on behalf of a client application.

The operations 600 further include, at block 625, transmitting the inference to the client application or to a storage location.

In some embodiments, the operations further include storing, by a storage service of a multi-tenant provider network, the first plurality of documents and the first plurality of labels at one or more storage locations; receiving, by a language processing service of the multi-tenant provider network, a request originated by the computing device of the user to create a document classifier or an entity recognizer, the request identifying the one or more storage locations, wherein the computing device is located outside of the multi-tenant provider network; and obtaining, by the language processing service, the first plurality of documents and the first plurality of labels. In some embodiments, the operations further include associating an endpoint, within a multi-tenant provider network, with the ML model; and sending an identifier of the endpoint to the computing device.

Figure 7:
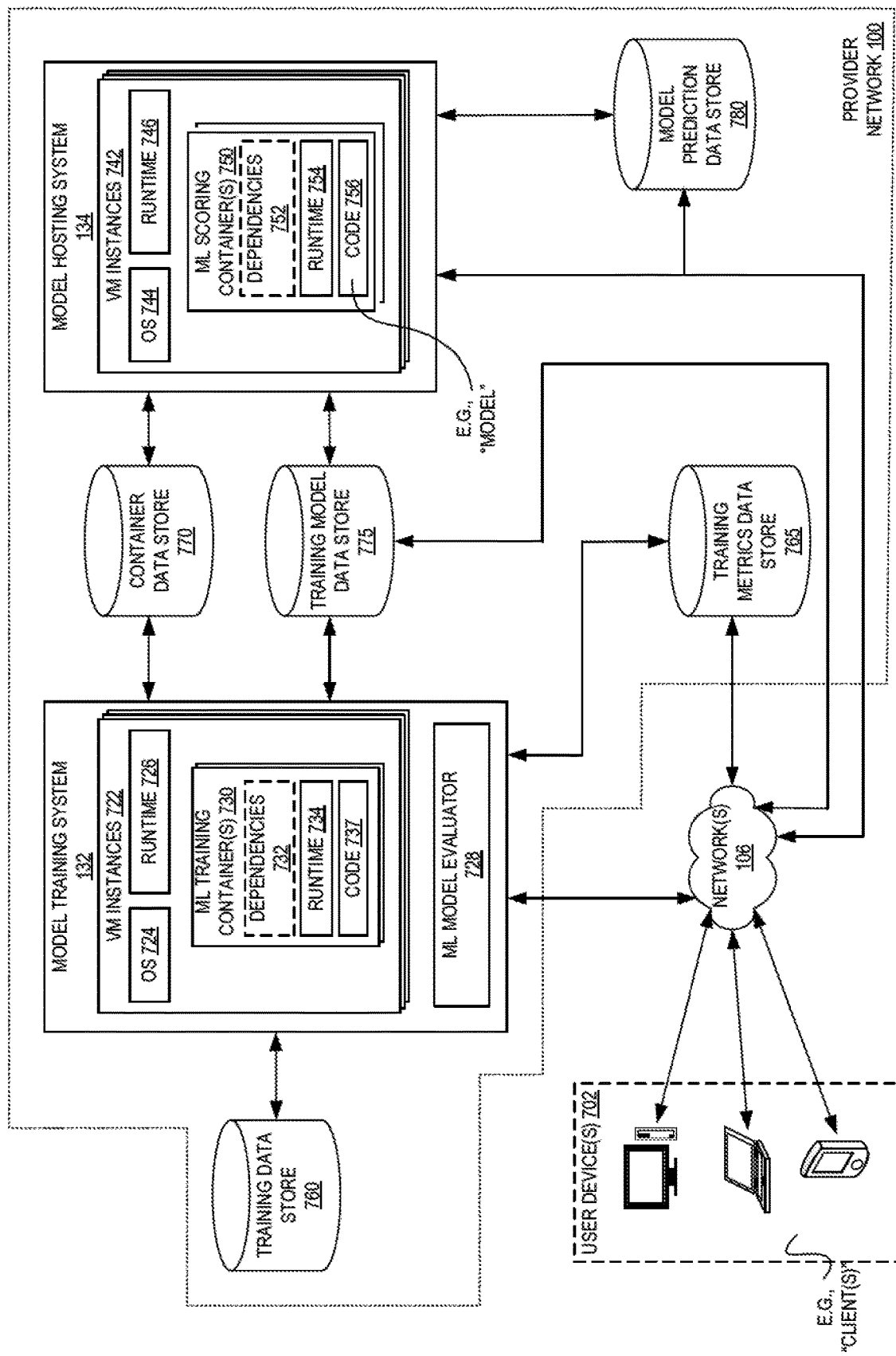
FIG. 7 is a block diagram of an illustrative operating environment in which machine learning models are trained and hosted according to some embodiments.

FIG. 7 is a block diagram of an illustrative operating environment in which machine learning models are trained and hosted according to some embodiments. The operating environment includes end user devices 702 (for example, computing devices(s) 104), a model training system 132, a model hosting system 134, a training data store 760, a training metrics data store 765, a container data store 770, a training model data store 775, and a model prediction data store 780.

A machine learning service 130 described herein may include one or more of these entities, such as the model hosting system 134, model training system 132, and so forth.

In some embodiments, users, by way of user devices 702, interact with the model training system 132 to provide data that causes the model training system 132 to train one or more machine learning models, for example, as described elsewhere herein. A machine learning model, generally, may be thought of as one or more equations that are "trained" using a set of data. In some embodiments, the model training system 132 provides ML functionalities as a web service, and thus messaging between user devices 702 and the model training system 132 (or provider network 100), and/or between components of the model training system 132 (or provider network 100), can use HTTP messages to transfer data in a machine-readable file format, such as eXtensible Markup Language (XML) or JavaScript Object Notation (JSON). In some embodiments, providing access to various functionality as a web service is not limited to communications exchanged via the World Wide Web and more generally refers to a service that can communicate with other electronic devices via a computer network.

The user devices 702 can interact with the model training system 132 via frontend 729 of the model training system 132. For example, a user device 702 can provide a training request to the frontend 729 that includes a container image (or multiple container images, or an identifier of one or multiple locations where container images are stored), an indicator of input data (for example, an address or location of input data), one or more hyperparameter values (for example, values indicating how the algorithm will operate, how many algorithms to run in parallel, how many clusters into which to separate data, and so forth), and/or information describing the computing machine on which to train a machine learning model (for example, a graphical processing unit (GPU) instance type, a central processing unit (CPU) instance type, an amount of memory to allocate, a type of virtual machine instance to use for training, and so forth).

In some embodiments, the container image can include one or more layers, where each layer represents an executable instruction. Some or all of the executable instructions together represent an algorithm that defines a machine learning model. The executable instructions (for example, the algorithm) can be written in any programming language (for example, Python, Ruby, C++, Java, etc.). In some embodiments, the algorithm is pre-generated and obtained by a user, via the user device 702, from an algorithm repository (for example, a network-accessible marketplace, a data store provided by a machine learning training service, etc.). In some embodiments, the algorithm is completely user-generated or partially user-generated (for example, user-provided code modifies or configures existing algorithmic code).

In some embodiments, instead of providing a container image (or identifier thereof) in the training request, the user device 702 may provide, in the training request, an algorithm written in any programming language. The model training system 132 then packages the algorithm into a container (optionally with other code, such as a "base" ML algorithm supplemented with user-provided code) that is eventually loaded into a virtual machine instance 722 for training a machine learning model, as described in greater detail below. For example, a user, via a user device 702, may develop an algorithm/code using an application (for example, an interactive web-based programming environment) and cause the algorithm/code to be provided—perhaps as part of a training request (or referenced in a training request)—to the model training system 132, where this algorithm/code may be containerized on its own or used together with an existing container having a machine learning framework, for example.

In some embodiments, instead of providing a container image in the training request, the user device 702 provides, in the training request, an indicator of a container image (for example, an indication of an address or a location at which a container image is stored). For example, the container image can be stored in a container data store 770, and this container image may have been previously created/uploaded by the user. The model training system 132 can retrieve the container image from the indicated location and create a container using the retrieved container image. The container is then loaded into a virtual machine instance 722 for training a machine learning model, as described in greater detail below.

The model training system 132 can use the information provided by the user device 702 to train a machine learning model in one or more pre-established virtual machine instances 722 in some embodiments. In particular, the model training system 132 includes a single physical computing device or multiple physical computing devices that are interconnected using one or more computing networks (not shown), where the physical computing device(s) host one or more virtual machine instances 722. The model training system 132 can handle the acquisition and configuration of compute capacity (for example, containers, instances, etc., which are described in greater detail below) based on the information describing the computing machine on which to train a machine learning model provided by the user device 702. The model training system 132 can then train machine learning models using the compute capacity, as is described in greater detail below. The model training system 132 can automatically scale up and down based on the volume of training requests received from user devices 702 via frontend 729, thereby relieving the user from the burden of having to worry about over-utilization (for example, acquiring too little computing resources and suffering performance issues) or under-utilization (for example, acquiring more computing resources than necessary to train the machine learning models, and thus overpaying).

In some embodiments, the virtual machine instances 722 are utilized to execute tasks. For example, such tasks can include training a machine learning model. As shown in FIG. 7, each virtual machine instance 722 includes an operating system (OS) 724, a language runtime 726, and one or more ML training containers 730. Generally, the ML training containers 730 are logical units created within a virtual machine instance using the resources available on that instance and can be utilized to isolate execution of a task from other processes (for example, task executions) occurring in the instance. In some embodiments, the ML training containers 730 are formed from one or more container images and a top container layer. Each container image may further include one or more image layers, where each image layer represents an executable instruction. As described above, some or all of the executable instructions together represent an algorithm that defines a machine learning model. Changes made to the ML training containers 730 (for example, creation of new files, modification of existing files, deletion of files, etc.) are stored in the top container layer. If a ML training container 730 is deleted, the top container layer is also deleted. However, the container image(s) that form a portion of the deleted ML training container 730 can remain unchanged. The ML training containers 730 can be implemented, for example, as Linux containers (LXC), Docker containers, and the like.

The ML training containers 730 may include individual a runtime 734, code 737, and dependencies 732 needed by the code 737 in some embodiments. The runtime 734 can be defined by one or more executable instructions that form at least a portion of a container image that is used to form the ML training container 730 (for example, the executable instruction(s) in the container image that define the operating system and/or runtime to run in the container formed from the container image). The code 737 includes one or more executable instructions that form at least a portion of a container image that is used to form the ML training container 730. For example, the code 737 includes the executable instructions in the container image that represent an algorithm that defines a machine learning model, which may reference (or utilize) code or libraries from dependencies 732. The runtime 734 is configured to execute the code 737 in response to an instruction to begin machine learning model training Execution of the code 737 results in the generation of model data, as described in greater detail below.

In some embodiments, the code 737 includes executable instructions that represent algorithms that define different machine learning models. For example, the code 737 includes one set of executable instructions that represent a first algorithm that defines a first machine learning model and a second set of executable instructions that represent a second algorithm that defines a second machine learning model. In some embodiments, the virtual machine instance 722 executes the code 737 and trains all of the machine learning models. In some embodiments, the virtual machine instance 722 executes the code 737, selecting one of the machine learning models to train. For example, the virtual machine instance 722 can identify a type of training data indicated by the training request and select a machine learning model to train (for example, execute the executable instructions that represent an algorithm that defines the selected machine learning model) that corresponds with the identified type of training data.

In some embodiments, the runtime 734 is the same as the runtime 726 utilized by the virtual machine instance 722. In some embodiments, the runtime 734 is different than the runtime 726 utilized by the virtual machine instance 722.

In some embodiments, the model training system 132 uses one or more container images included in a training request (or a container image retrieved from the container data store 770 in response to a received training request) to create and initialize a ML training container 730 in a virtual machine instance 722. For example, the model training system 132 creates a ML training container 730 that includes the container image(s) and/or a top container layer.

Prior to beginning the training process, in some embodiments, the model training system 132 retrieves training data from the location indicated in the training request. For example, the location indicated in the training request can be a location in the training data store 760. Thus, the model training system 132 retrieves the training data from the indicated location in the training data store 760. In some embodiments, the model training system 132 does not retrieve the training data prior to beginning the training process. Rather, the model training system 132 streams the training data from the indicated location during the training process. For example, the model training system 132 can initially retrieve a portion of the training data and provide the retrieved portion to the virtual machine instance 722 training the machine learning model. Once the virtual machine instance 722 has applied and used the retrieved portion or once the virtual machine instance 722 is about to use all of the retrieved portion (for example, a buffer storing the retrieved portion is nearly empty), then the model training system 132 can retrieve a second portion of the training data and provide the second retrieved portion to the virtual machine instance 722, and so on.

To perform the machine learning model training, the virtual machine instance 722 executes code 737 stored in the ML training container 730 in some embodiments. For example, the code 737 includes some or all of the executable instructions that form the container image of the ML training container 730 initialized therein. Thus, the virtual machine instance 722 executes some or all of the executable instructions that form the container image of the ML training container 730 initialized therein to train a machine learning model. The virtual machine instance 722 executes some or all of the executable instructions according to the hyperparameter values included in the training request. As an illustrative example, the virtual machine instance 722 trains a machine learning model by identifying values for certain parameters (for example, coefficients, weights, centroids, etc.). The identified values depend on hyperparameters that define how the training is performed. Thus, the virtual machine instance 722 can execute the executable instructions to initiate a machine learning model training process, where the training process is run using the hyperparameter values included in the training request. Execution of the executable instructions can include the virtual machine instance 722 applying the training data retrieved by the model training system 132 as input parameters to some or all of the instructions being executed.

In some embodiments, executing the executable instructions causes the virtual machine instance 722 (for example, the ML training container 730) to generate model data. For example, the ML training container 730 generates model data and stores the model data in a file system of the ML training container 730. The model data includes characteristics of the machine learning model being trained, such as a number of layers in the machine learning model, hyperparameters of the machine learning model, coefficients of the machine learning model, weights of the machine learning model, and/or the like. In particular, the generated model data includes values for the characteristics that define a machine learning model being trained. In some embodiments, executing the executable instructions causes a modification to the ML training container 730 such that the model data is written to the top container layer of the ML training container 730 and/or the container image(s) that forms a portion of the ML training container 730 is modified to include the model data.

The virtual machine instance 722 (or the model training system 132 itself) pulls the generated model data from the ML training container 730 and stores the generated model data in the training model data store 775 in an entry associated with the virtual machine instance 722 and/or the machine learning model being trained. In some embodiments, the virtual machine instance 722 generates a single file that includes model data and stores the single file in the training model data store 775. In some embodiments, the virtual machine instance 722 generates multiple files during the course of training a machine learning model, where each file includes model data. In some embodiments, each model data file includes the same or different model data information (for example, one file identifies the structure of an algorithm, another file includes a list of coefficients, etc.). The virtual machine instance 722 can package the multiple files into a single file once training is complete and store the single file in the training model data store 775. Alternatively, the virtual machine instance 722 stores the multiple files in the training model data store 775. The virtual machine instance 722 stores the file(s) in the training model data store 775 while the training process is ongoing and/or after the training process is complete.

In some embodiments, the virtual machine instance 722 regularly stores model data file(s) in the training model data store 775 as the training process is ongoing. Thus, model data file(s) can be stored in the training model data store 775 at different times during the training process. Each set of model data files corresponding to a particular time or each set of model data files present in the training model data store 775 as of a particular time could be checkpoints that represent different versions of a partially-trained machine learning model during different stages of the training process. Accordingly, before training is complete, a user, via the user device 702 can submit a deployment and/or execution request in a manner as described below to deploy and/or execute a version of a partially trained machine learning model (for example, a machine learning model trained as of a certain stage in the training process). A version of a partially-trained machine learning model can be based on some or all of the model data files stored in the training model data store 775.

In some embodiments, a virtual machine instance 722 executes code 737 stored in a plurality of ML training containers 730. For example, the algorithm included in the container image can be in a format that allows for the parallelization of the training process. Thus, the model training system 132 can create multiple copies of the container image provided in a training request and cause the virtual machine instance 722 to load each container image copy in a separate ML training container 730. The virtual machine instance 722 can then execute, in parallel, the code 737 stored in the ML training containers 730. The virtual machine instance 722 can further provide configuration information to each ML training container 730 (for example, information indicating that N ML training containers 730 are collectively training a machine learning model and that a particular ML training container 730 receiving the configuration information is ML training container 730 number X of N), which can be included in the resulting model data. By parallelizing the training process, the model training system 132 can significantly reduce the training time in some embodiments.

In some embodiments, a plurality of virtual machine instances 722 execute code 737 stored in a plurality of ML training containers 730. For example, the resources used to train a particular machine learning model can exceed the limitations of a single virtual machine instance 722. However, the algorithm included in the container image can be in a format that allows for the parallelization of the training process. Thus, the model training system 132 can create multiple copies of the container image provided in a training request, initialize multiple virtual machine instances 722, and cause each virtual machine instance 722 to load a container image copy in one or more separate ML training containers 730. The virtual machine instances 722 can then each execute the code 737 stored in the ML training containers 730 in parallel. The model training system 132 can further provide configuration information to each ML training container 730 via the virtual machine instances 722 (for example, information indicating that N ML training containers 730 are collectively training a machine learning model and that a particular ML training container 730 receiving the configuration information is ML training container 730 number X of N, information indicating that M virtual machine instances 722 are collectively training a machine learning model and that a particular ML training container 730 receiving the configuration information is initialized in virtual machine instance 722 number Y of M, etc.), which can be included in the resulting model data. As described above, by parallelizing the training process, the model training system 132 can significantly reduce the training time in some embodiments.

In some embodiments, the model training system 132 includes a plurality of physical computing devices and two or more of the physical computing devices hosts one or more virtual machine instances 722 that execute the code 737. Thus, the parallelization can occur over different physical computing devices in addition to over different virtual machine instances 722 and/or ML training containers 730.

In some embodiments, the model training system 132 includes a ML model evaluator 728. The ML model evaluator 728 can monitor virtual machine instances 722 as machine learning models are being trained, obtaining the generated model data and processing the obtained model data to generate model metrics. For example, the model metrics can include quality metrics, such as an error rate of the machine learning model being trained, a statistical distribution of the machine learning model being trained, a latency of the machine learning model being trained, a confidence level of the machine learning model being trained (for example, a level of confidence that the accuracy of the machine learning model being trained is known, etc. The ML model evaluator 728 can obtain the model data for a machine learning model being trained and evaluation data from the training data store 760. The evaluation data is separate from the data used to train a machine learning model and includes both input data and expected outputs (for example, known results), and thus the ML model evaluator 728 can define a machine learning model using the model data and execute the machine learning model by providing the input data as inputs to the machine learning model. The ML model evaluator 728 can then compare the outputs of the machine learning model to the expected outputs and determine one or more quality metrics of the machine learning model being trained based on the comparison (for example, the error rate can be a difference or distance between the machine learning model outputs and the expected outputs).

The ML model evaluator 728 periodically generates model metrics during the training process and stores the model metrics in the training metrics data store 765 in some embodiments. While the machine learning model is being trained, a user, via the user device 702, can access and retrieve the model metrics from the training metrics data store 765. The user can then use the model metrics to determine whether to adjust the training process and/or to stop the training process. For example, the model metrics can indicate that the machine learning model is performing poorly (for example, has an error rate above a threshold value, has a statistical distribution that is not an expected or desired distribution (for example, not a binomial distribution, a Poisson distribution, a geometric distribution, a normal distribution, Gaussian distribution, etc.), has an execution latency above a threshold value, has a confidence level below a threshold value)) and/or is performing progressively worse (for example, the quality metric continues to worsen over time). In response, in some embodiments, the user, via the user device 702, can transmit a request to the model training system 132 to modify the machine learning model being trained (for example, transmit a modification request). The request can include a new or modified container image, a new or modified algorithm, new or modified hyperparameter(s), and/or new or modified information describing the computing machine on which to train a machine learning model. The model training system 132 can modify the machine learning model accordingly. For example, the model training system 132 can cause the virtual machine instance 722 to optionally delete an existing ML training container 730, create and initialize a new ML training container 730 using some or all of the information included in the request, and execute the code 737 stored in the new ML training container 730 to restart the machine learning model training process. As another example, the model training system 132 can cause the virtual machine instance 722 to modify the execution of code stored in an existing ML training container 730 according to the data provided in the modification request. In some embodiments, the user, via the user device 702, can transmit a request to the model training system 132 to stop the machine learning model training process. The model training system 132 can then instruct the virtual machine instance 722 to delete the ML training container 730 and/or to delete any model data stored in the training model data store 775.

As described below, in some embodiments, the model data stored in the training model data store 775 is used by the model hosting system 134 to deploy machine learning models. Alternatively or additionally, a user device 702 or another computing device (not shown) can retrieve the model data from the training model data store 775 to implement a learning algorithm in an external device. As an illustrative example, a robotic device can include sensors to capture input data. A user device 702 can retrieve the model data from the training model data store 775 and store the model data in the robotic device. The model data defines a machine learning model. Thus, the robotic device can provide the captured input data as an input to the machine learning model, resulting in an output. The robotic device can then perform an action (for example, move forward, raise an arm, generate a sound, etc.) based on the resulting output.

While the virtual machine instances 722 are shown in FIG. 7 as a single grouping of virtual machine instances 722, some embodiments of the present application separate virtual machine instances 722 that are actively assigned to execute tasks from those virtual machine instances 722 that are not actively assigned to execute tasks. For example, those virtual machine instances 722 actively assigned to execute tasks are grouped into an "active pool," while those virtual machine instances 722 not actively assigned to execute tasks are placed within a "warming pool." In some embodiments, those virtual machine instances 722 within the warming pool can be pre-initialized with an operating system, language runtimes, and/or other software required to enable rapid execution of tasks (for example, rapid initialization of machine learning model training in ML training container(s) 730) in response to training requests.

In some embodiments, the model training system 132 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (for example, user devices 702, the model hosting system 134, etc.). The processing unit can also communicate to and from a memory of a virtual machine instance 722 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the model hosting system 134 includes a single physical computing device or multiple physical computing devices that are interconnected using one or more computing networks (not shown), where the physical computing device(s) host one or more virtual machine instances 742. The model hosting system 134 can handle the acquisition and configuration of compute capacity (for example, containers, instances, etc.) based on demand for the execution of trained machine learning models. The model hosting system 134 can then execute machine learning models using the compute capacity, as is described in greater detail below. The model hosting system 134 can automatically scale up and down based on the volume of execution requests received from user devices 702 via frontend 749 of the model hosting system 134, thereby relieving the user from the burden of having to worry about over-utilization (for example, acquiring too little computing resources and suffering performance issues) or under-utilization (for example, acquiring more computing resources than necessary to run the machine learning models, and thus overpaying).

In some embodiments, the virtual machine instances 742 are utilized to execute tasks. For example, such tasks can include executing a machine learning model. As shown in FIG. 7, each virtual machine instance 742 includes an operating system (OS) 744, a language runtime 746, and one or more ML scoring containers 750. The ML scoring containers 750 are similar to the ML training containers 730 in that the ML scoring containers 750 are logical units created within a virtual machine instance using the resources available on that instance and can be utilized to isolate execution of a task from other processes (for example, task executions) occurring in the instance. In some embodiments, the ML scoring containers 750 are formed from one or more container images and a top container layer. Each container image further includes one or more image layers, where each image layer represents an executable instruction. As described above, some or all of the executable instructions together represent an algorithm that defines a machine learning model. Changes made to the ML scoring containers 750 (for example, creation of new files, modification of existing files, deletion of files, etc.) are stored in the top container layer. If a ML scoring container 750 is deleted, the top container layer is also deleted. However, the container image(s) that form a portion of the deleted ML scoring container 750 can remain unchanged. The ML scoring containers 750 can be implemented, for example, as Linux containers.

The ML scoring containers 750 each include a runtime 754, code 756, and dependencies 752 (for example, supporting software such as libraries) needed by the code 756 in some embodiments. The runtime 754 can be defined by one or more executable instructions that form at least a portion of a container image that is used to form the ML scoring container 750 (for example, the executable instruction(s) in the container image that define the operating system and/or runtime to run in the container formed from the container image). The code 756 includes one or more executable instructions that form at least a portion of a container image that is used to form the ML scoring container 750. For example, the code 756 includes the executable instructions in the container image that represent an algorithm that defines a machine learning model, which may reference dependencies 752. The code 756 can also include model data that represent characteristics of the defined machine learning model, as described in greater detail below. The runtime 754 is configured to execute the code 756 in response to an instruction to begin execution of a machine learning model. Execution of the code 756 results in the generation of outputs (for example, predicted results), as described in greater detail below.

In some embodiments, the runtime 754 is the same as the runtime 746 utilized by the virtual machine instance 742. In some embodiments, runtime 754 is different than the runtime 746 utilized by the virtual machine instance 742.

In some embodiments, the model hosting system 134 uses one or more container images included in a deployment request (or a container image retrieved from the container data store 770 in response to a received deployment request) to create and initialize a ML scoring container 750 in a virtual machine instance 742. For example, the model hosting system 134 creates a ML scoring container 750 that includes the container image(s) and/or a top container layer.

As described above, a user device 702 can submit a deployment request and/or an execution request to the model hosting system 134 via the frontend 749 in some embodiments. A deployment request causes the model hosting system 134 to deploy a trained machine learning model into a virtual machine instance 742. For example, the deployment request can include an identification of an endpoint (for example, an endpoint name, such as an HTTP endpoint name) and an identification of one or more trained machine learning models (for example, a location of one or more model data files stored in the training model data store 775). Optionally, the deployment request also includes an identification of one or more container images stored in the container data store 770.

Upon receiving the deployment request, the model hosting system 134 initializes ones or more ML scoring containers 750 in one or more hosted virtual machine instance 742. In embodiments in which the deployment request includes an identification of one or more container images, the model hosting system 134 forms the ML scoring container(s) 750 from the identified container image(s). For example, a container image identified in a deployment request can be the same container image used to form an ML training container 730 used to train the machine learning model corresponding to the deployment request. Thus, the code 756 of the ML scoring container(s) 750 includes one or more executable instructions in the container image(s) that represent an algorithm that defines a machine learning model. In embodiments in which the deployment request does not include an identification of a container image, the model hosting system 134 forms the ML scoring container(s) 750 from one or more container images stored in the container data store 770 that are appropriate for executing the identified trained machine learning model(s). For example, an appropriate container image can be a container image that includes executable instructions that represent an algorithm that defines the identified trained machine learning model(s).

The model hosting system 134 further forms the ML scoring container(s) 750 by retrieving model data corresponding to the identified trained machine learning model(s) in some embodiments. For example, the deployment request can identify a location of model data file(s) stored in the training model data store 775. In embodiments in which a single model data file is identified in the deployment request, the model hosting system 134 retrieves the identified model data file from the training model data store 775 and inserts the model data file into a single ML scoring container 750, which forms a portion of code 756. In some embodiments, the model data file is archived or compressed (for example, formed from a package of individual files). Thus, the model hosting system 134 unarchives or decompresses the model data file to obtain multiple individual files and inserts the individual files into the ML scoring container 750. In some embodiments, the model hosting system 134 stores the model data file in the same location as the location in which the model data file was stored in the ML training container 730 that generated the model data file. For example, the model data file initially was stored in the top container layer of the ML training container 730 at a certain offset, and the model hosting system 134 then stores the model data file in the top container layer of the ML scoring container 750 at the same offset.

In embodiments in which multiple model data files are identified in the deployment request, the model hosting system 134 retrieves the identified model data files from the training model data store 775. The model hosting system 134 can insert the model data files into the same ML scoring container 750, into different ML scoring containers 750 initialized in the same virtual machine instance 742, or into different ML scoring containers 750 initialized in different virtual machine instances 742. As an illustrative example, the deployment request can identify multiple model data files corresponding to different trained machine learning models because the trained machine learning models are related (for example, the output of one trained machine learning model is used as an input to another trained machine learning model). Thus, the user may desire to deploy multiple machine learning models to eventually receive a single output that relies on the outputs of multiple machine learning models.

In some embodiments, the model hosting system 134 associates the initialized ML scoring container(s) 750 with the endpoint identified in the deployment request. For example, each of the initialized ML scoring container(s) 750 can be associated with a network address. The model hosting system 134 can map the network address(es) to the identified endpoint, and the model hosting system 134 or another system (for example, a routing system, not shown) can store the mapping. Thus, a user device 702 can refer to trained machine learning model(s) stored in the ML scoring container(s) 750 using the endpoint. This allows for the network address of an ML scoring container 750 to change without causing the user operating the user device 702 to change the way in which the user refers to a trained machine learning model.

Once the ML scoring container(s) 750 are initialized, the ML scoring container(s) 750 are ready to execute trained machine learning model(s). In some embodiments, the user device 702 transmits an execution request to the model hosting system 134 via the frontend 749, where the execution request identifies an endpoint and includes an input to a machine learning model (for example, a set of input data). The model hosting system 134 or another system (for example, a routing system, not shown) can obtain the execution request, identify the ML scoring container(s) 750 corresponding to the identified endpoint, and route the input to the identified ML scoring container(s) 750.

In some embodiments, a virtual machine instance 742 executes the code 756 stored in an identified ML scoring container 750 in response to the model hosting system 134 receiving the execution request. In particular, execution of the code 756 causes the executable instructions in the code 756 corresponding to the algorithm to read the model data file stored in the ML scoring container 750, use the input included in the execution request as an input parameter, and generate a corresponding output. As an illustrative example, the algorithm can include coefficients, weights, layers, cluster centroids, and/or the like. The executable instructions in the code 756 corresponding to the algorithm can read the model data file to determine values for the coefficients, weights, layers, cluster centroids, and/or the like. The executable instructions can include input parameters, and the input included in the execution request can be supplied by the virtual machine instance 742 as the input parameters. With the machine learning model characteristics and the input parameters provided, execution of the executable instructions by the virtual machine instance 742 can be completed, resulting in an output.

In some embodiments, the virtual machine instance 742 stores the output in the model prediction data store 780. Alternatively or in addition, the virtual machine instance 742 transmits the output to the user device 702 that submitted the execution result via the frontend 749.

In some embodiments, the execution request corresponds to a group of related trained machine learning models. Thus, the ML scoring container 750 can transmit the output to a second ML scoring container 750 initialized in the same virtual machine instance 742 or in a different virtual machine instance 742. The virtual machine instance 742 that initialized the second ML scoring container 750 can then execute second code 756 stored in the second ML scoring container 750, providing the received output as an input parameter to the executable instructions in the second code 756. The second ML scoring container 750 further includes a model data file stored therein, which is read by the executable instructions in the second code 756 to determine values for the characteristics defining the machine learning model. Execution of the second code 756 results in a second output. The virtual machine instance 742 that initialized the second ML scoring container 750 can then transmit the second output to the model prediction data store 780 and/or the user device 702 via the frontend 749 (for example, if no more trained machine learning models are needed to generate an output) or transmit the second output to a third ML scoring container 750 initialized in the same or different virtual machine instance 742 (for example, if outputs from one or more additional trained machine learning models are needed), and the above-referenced process can be repeated with respect to the third ML scoring container 750.

While the virtual machine instances 742 are shown in FIG. 7 as a single grouping of virtual machine instances 742, some embodiments of the present application separate virtual machine instances 742 that are actively assigned to execute tasks from those virtual machine instances 742 that are not actively assigned to execute tasks. For example, those virtual machine instances 742 actively assigned to execute tasks are grouped into an "active pool," while those virtual machine instances 742 not actively assigned to execute tasks are placed within a "warming pool." In some embodiments, those virtual machine instances 742 within the warming pool can be pre-initialized with an operating system, language runtimes, and/or other software required to enable rapid execution of tasks (for example, rapid initialization of ML scoring container(s) 750, rapid execution of code 756 in ML scoring container(s), etc.) in response to deployment and/or execution requests.

In some embodiments, the model hosting system 134 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (for example, user devices 702, the model training system 132, etc.). The processing unit can also communicate to and from a memory of a virtual machine instance 742 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the operating environment supports many different types of machine learning models, such as multi arm bandit models, reinforcement learning models, ensemble machine learning models, deep learning models, and/or the like.

The model training system 132 and the model hosting system 134 depicted in FIG. 7 are not meant to be limiting. For example, the model training system 132 and/or the model hosting system 134 could also operate within a computing environment having a fewer or greater number of devices than are illustrated in FIG. 7. Thus, the depiction of the model training system 132 and/or the model hosting system 134 in FIG. 7 may be taken as illustrative and not limiting to the present disclosure. For example, the model training system 132 and/or the model hosting system 134 or various constituents thereof could implement various web services components, hosted or "cloud" computing environments, and/or peer-to-peer network configurations to implement at least a portion of the processes described herein. In some embodiments, the model training system 132 and/or the model hosting system 134 are implemented directly in hardware or software executed by hardware devices and may, for instance, include one or more physical or virtual servers implemented on physical computer hardware configured to execute computer-executable instructions for performing the various features that are described herein. The one or more servers can be geographically dispersed or geographically co-located, for instance, in one or more points of presence (POPs) or regional data centers.

The frontend 729 processes all training requests received from user devices 702 and provisions virtual machine instances 722. In some embodiments, the frontend 729 serves as a front door to all the other services provided by the model training system 132. The frontend 729 processes the requests and makes sure that the requests are properly authorized. For example, the frontend 729 may determine whether the user associated with the training request is authorized to initiate the training process.

Similarly, frontend 749 processes all deployment and execution requests received from user devices 702 and provisions virtual machine instances 742. In some embodiments, the frontend 749 serves as a front door to all the other services provided by the model hosting system 134. The frontend 749 processes the requests and makes sure that the requests are properly authorized. For example, the frontend 749 may determine whether the user associated with a deployment request or an execution request is authorized to access the indicated model data and/or to execute the indicated machine learning model.

The training data store 760 stores training data and/or evaluation data. The training data can be data used to train machine learning models and evaluation data can be data used to evaluate the performance of machine learning models. In some embodiments, the training data and the evaluation data have common data. In some embodiments, the training data and the evaluation data do not have common data. In some embodiments, the training data includes input data and expected outputs. While the training data store 760 is depicted as being located external to the model training system 132 and the model hosting system 134, this is not meant to be limiting. For example, in some embodiments not shown, the training data store 760 is located internal to at least one of the model training system 132 or the model hosting system 134.

In some embodiments, the training metrics data store 765 stores model metrics. While the training metrics data store 765 is depicted as being located external to the model training system 132 and the model hosting system 134, this is not meant to be limiting. For example, in some embodiments not shown, the training metrics data store 765 is located internal to at least one of the model training system 132 or the model hosting system 134.

The container data store 770 stores container images, such as container images used to form ML training containers 730 and/or ML scoring containers 750, that can be retrieved by various virtual machine instances 722 and/or 742. While the container data store 770 is depicted as being located external to the model training system 132 and the model hosting system 134, this is not meant to be limiting. For example, in some embodiments not shown, the container data store 770 is located internal to at least one of the model training system 132 and the model hosting system 134.

The training model data store 775 stores model data files. In some embodiments, some of the model data files are comprised of a single file, while other model data files are packages of multiple individual files. While the training model data store 775 is depicted as being located external to the model training system 132 and the model hosting system 134, this is not meant to be limiting. For example, in some embodiments not shown, the training model data store 775 is located internal to at least one of the model training system 132 or the model hosting system 134.

The model prediction data store 780 stores outputs (for example, execution results) generated by the ML scoring containers 750 in some embodiments. While the model prediction data store 780 is depicted as being located external to the model training system 132 and the model hosting system 134, this is not meant to be limiting. For example, in some embodiments not shown, the model prediction data store 780 is located internal to at least one of the model training system 132 and the model hosting system 134.

While the model training system 132, the model hosting system 134, the training data store 760, the training metrics data store 765, the container data store 770, the training model data store 775, and the model prediction data store 780 are illustrated as separate components, this is not meant to be limiting. In some embodiments, any one or all of these components can be combined to perform the functionality described herein. For example, any one or all of these components can be implemented by a single computing device, or by multiple distinct computing devices, such as computer servers, logically or physically grouped together to collectively operate as a server system. Any one or all of these components can communicate via a shared internal network, and the collective system (for example, also referred to herein as a machine learning service) can communicate with one or more of the user devices 702 via the one or more network(s) 106.

Various example user devices 702 are shown in FIG. 7, including a desktop computer, laptop, and a mobile phone, each provided by way of illustration. In general, the user devices 702 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. In some embodiments, the model training system 132 and/or the model hosting system 134 provides the user devices 702 with one or more user interfaces, command-line interfaces (CLI), application programming interfaces (API), and/or other programmatic interfaces for submitting training requests, deployment requests, and/or execution requests. In some embodiments, the user devices 702 can execute a stand-alone application that interacts with the model training system 132 and/or the model hosting system 134 for submitting training requests, deployment requests, and/or execution requests.

In some embodiments, the network 106 includes any wired network, wireless network, or combination thereof. For example, the network 106 may be a personal area network, local area network, wide area network, over-the-air broadcast network (for example, for radio or television), cable network, satellite network, cellular telephone network, or combination thereof. As a further example, the network 106 may be a publicly accessible network of linked networks, possibly operated by various distinct parties, such as the Internet. In some embodiments, the network 106 may be a private or semi-private network, such as a corporate or university intranet. The network 106 may include one or more wireless networks, such as a Global System for Mobile Communications (GSM) network, a Code Division Multiple Access (CDMA) network, a Long Term Evolution (LTE) network, or any other type of wireless network. The network 106 can use protocols and components for communicating via the Internet or any of the other aforementioned types of networks. For example, the protocols used by the network 106 may include HTTP, HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Figure 8:
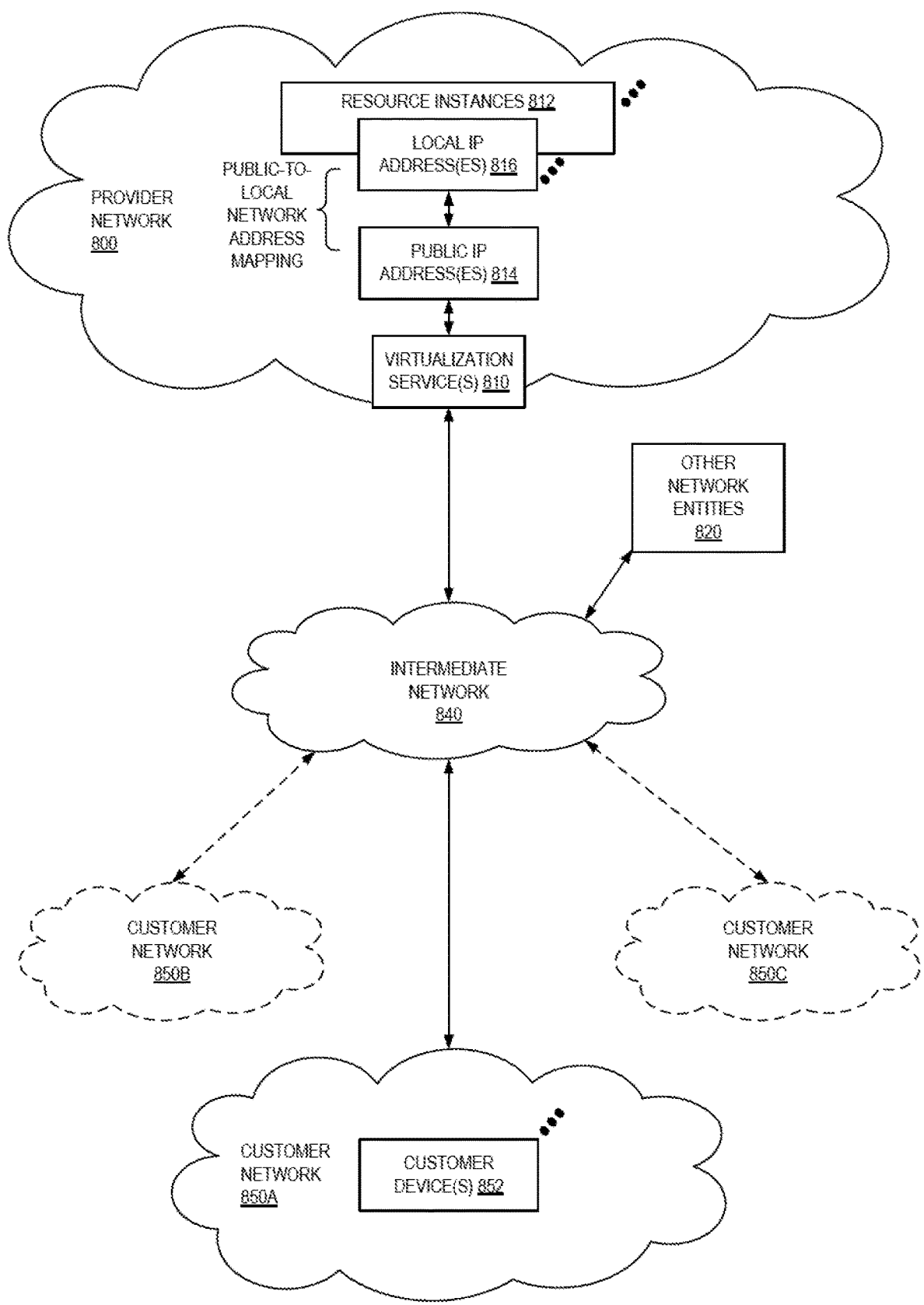
FIG. 8 illustrates an example provider network environment according to some embodiments.

FIG. 8 illustrates an example provider network (or "service provider system") environment according to some embodiments. A provider network 800 may provide resource virtualization to customers via one or more virtualization services 810 that allow customers to purchase, rent, or otherwise obtain instances 812 of virtualized resources, including but not limited to computation and storage resources, implemented on devices within the provider network or networks in one or more data centers. Local Internet Protocol (IP) addresses 816 may be associated with the resource instances 812; the local IP addresses are the internal network addresses of the resource instances 812 on the provider network 800. In some embodiments, the provider network 800 may also provide public IP addresses 814 and/or public IP address ranges (e.g., Internet Protocol version 4 (IPv4) or Internet Protocol version 6 (IPv6) addresses) that customers may obtain from the provider 800.

Conventionally, the provider network 800, via the virtualization services 810, may allow a customer of the service provider (e.g., a customer that operates one or more client networks 850A-850C including one or more customer device(s) 852) to dynamically associate at least some public IP addresses 814 assigned or allocated to the customer with particular resource instances 812 assigned to the customer. The provider network 800 may also allow the customer to remap a public IP address 814, previously mapped to one virtualized computing resource instance 812 allocated to the customer, to another virtualized computing resource instance 812 that is also allocated to the customer. Using the virtualized computing resource instances 812 and public IP addresses 814 provided by the service provider, a customer of the service provider such as the operator of customer network(s) 850A-850C may, for example, implement customer-specific applications and present the customer's applications on an intermediate network 840, such as the Internet.

Other network entities 820 on the intermediate network 840 may then generate traffic to a destination public IP address 814 published by the customer network(s) 850A-850C; the traffic is routed to the service provider data center, and at the data center is routed, via a network substrate, to the local IP address 816 of the virtualized computing resource instance 812 currently mapped to the destination public IP address 814. Similarly, response traffic from the virtualized computing resource instance 812 may be routed via the network substrate back onto the intermediate network 840 to the source entity 820.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 800; a customer may then assign their allocated public IP addresses to particular resource instances allocated to the customer. These public IP addresses may be referred to as customer public IP addresses, or simply customer IP addresses. Instead of being assigned by the provider network 800 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 9:
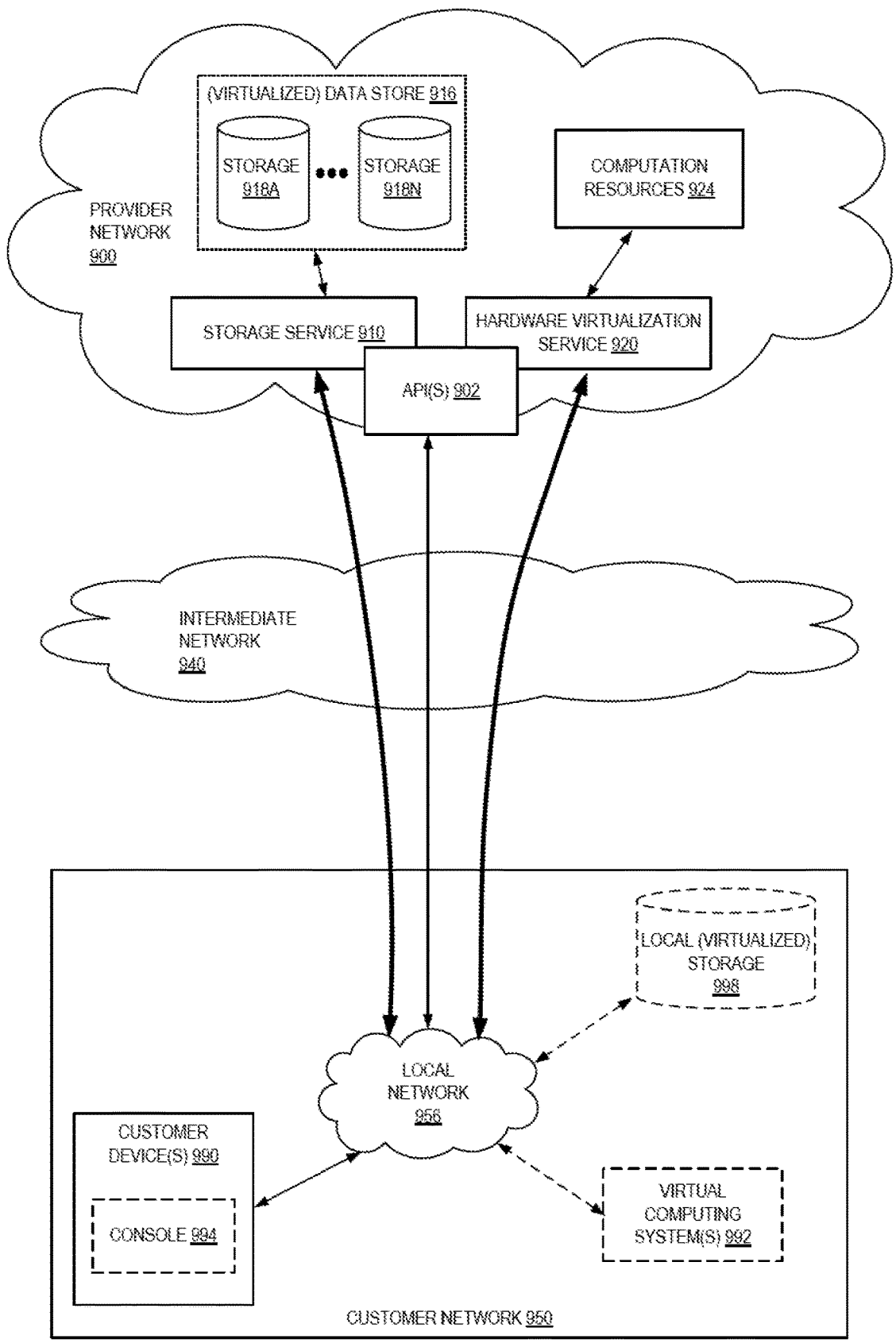
FIG. 9 is a block diagram of an example provider network that provides a storage service and a hardware virtualization service to customers according to some embodiments.

FIG. 9 is a block diagram of an example provider network that provides a storage service and a hardware virtualization service to customers, according to some embodiments. Hardware virtualization service 920 provides multiple computation resources 924 (e.g., VMs) to customers. The computation resources 924 may, for example, be rented or leased to customers of the provider network 900 (e.g., to a customer that implements customer network 950). Each computation resource 924 may be provided with one or more local IP addresses. Provider network 900 may be configured to route packets from the local IP addresses of the computation resources 924 to public Internet destinations, and from public Internet sources to the local IP addresses of computation resources 924.

Provider network 900 may provide a customer network 950, for example coupled to intermediate network 940 via local network 956, the ability to implement virtual computing systems 992 via hardware virtualization service 920 coupled to intermediate network 940 and to provider network 900. In some embodiments, hardware virtualization service 920 may provide one or more APIs 902, for example a web services interface, via which a customer network 950 may access functionality provided by the hardware virtualization service 920, for example via a console 994 (e.g., a web-based application, standalone application, mobile application, etc.). In some embodiments, at the provider network 900, each virtual computing system 992 at customer network 950 may correspond to a computation resource 924 that is leased, rented, or otherwise provided to customer network 950.

From an instance of a virtual computing system 992 and/or another customer device 990 (e.g., via console 994), the customer may access the functionality of storage service 910, for example via one or more APIs 902, to access data from and store data to storage resources 918A-918N of a virtual data store 916 (e.g., a folder or "bucket", a virtualized volume, a database, etc.) provided by the provider network 900. In some embodiments, a virtualized data store gateway (not shown) may be provided at the customer network 950 that may locally cache at least some data, for example frequently-accessed or critical data, and that may communicate with storage service 910 via one or more communications channels to upload new or modified data from a local cache so that the primary store of data (virtualized data store 916) is maintained. In some embodiments, a user, via a virtual computing system 992 and/or on another customer device 990, may mount and access virtual data store 916 volumes via storage service 910 acting as a storage virtualization service, and these volumes may appear to the user as local (virtualized) storage 998.

While not shown in FIG. 9, the virtualization service(s) may also be accessed from resource instances within the provider network 900 via API(s) 902. For example, a customer, appliance service provider, or other entity may access a virtualization service from within a respective virtual network on the provider network 900 via an API 902 to request allocation of one or more resource instances within the virtual network or within another virtual network.

Illustrative Systems

Figure 10:
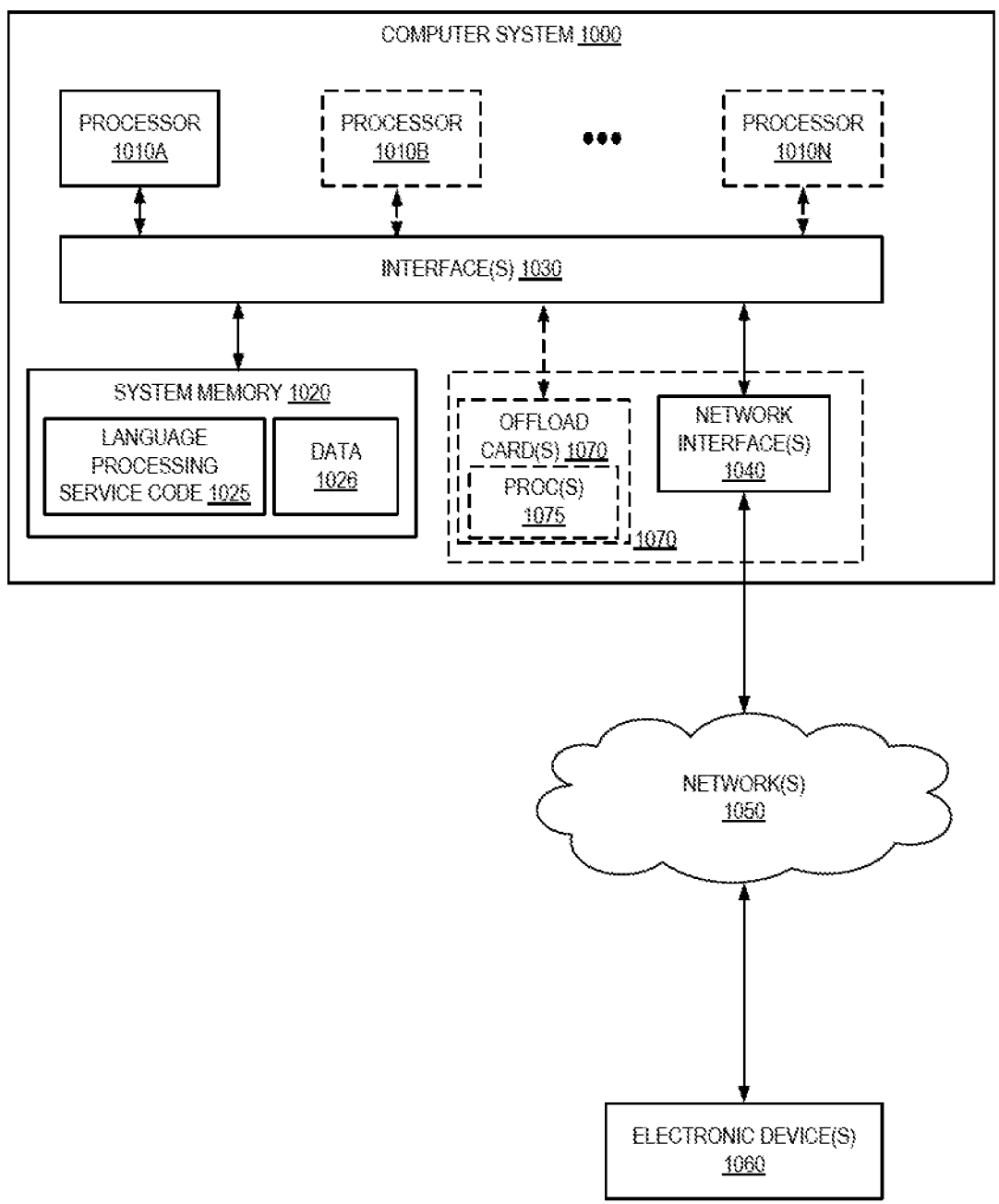
FIG. 10 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 1000 illustrated in FIG. 10. In the illustrated embodiment, computer system 1000 includes one or more processors 1010 coupled to a system memory 1020 via an input/output (I/O) interface 1030. Computer system 1000 further includes a network interface 1040 coupled to I/O interface 1030. While FIG. 10 shows computer system 1000 as a single computing device, in various embodiments a computer system 1000 may include one computing device or any number of computing devices configured to work together as a single computer system 1000.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1010 may commonly, but not necessarily, implement the same ISA.

System memory 1020 may store instructions and data accessible by processor(s) 1010. In various embodiments, system memory 1020 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1020 as language processing service code 1025 and data 1026.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices 1060 attached to a network or networks 1050, such as other computer systems or devices as illustrated in FIG. 1, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1000 includes one or more offload cards 1070 (including one or more processors 1075, and possibly including the one or more network interfaces 1040) that are connected using an I/O interface 1030 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1000 may act as a host electronic device (e.g., operating as part of a hardware virtualization service) that hosts compute instances, and the one or more offload cards 1070 execute a virtualization manager that can manage compute instances that execute on the host electronic device. As an example, in some embodiments the offload card(s) 1070 can perform compute instance management operations such as pausing and/or un-pausing compute instances, launching and/or terminating compute instances, performing memory transfer/copying operations, etc. These management operations may, in some embodiments, be performed by the offload card(s) 1070 in coordination with a hypervisor (e.g., upon a request from a hypervisor) that is executed by the other processors 1010A-1010N of the computer system 1000. However, in some embodiments the virtualization manager implemented by the offload card(s) 1070 can accommodate requests from other entities (e.g., from compute instances themselves), and may not coordinate with (or service) any separate hypervisor.

In some embodiments, system memory 1020 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 918A-918N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
receiving, at a service of a multi-tenant provider network from a computing device of a user located outside the multi-tenant provider network, a first plurality of documents and a first plurality of labels;
storing the first plurality of documents and the first plurality of labels at one or more storage locations within the multi-tenant provider network;
receiving, from the computing device, a request originated by the computing device of the user to create a document classifier, the request identifying the one or more storage locations;
generating a second plurality of documents and a second plurality of labels based at least in part on the first plurality of documents, the first plurality of labels, and a repository of documents, wherein at least one document of the second plurality of documents does not exist within both the first plurality of documents and the repository of documents;
training a machine learning (ML) model using a training dataset comprising at least the first plurality of documents, the first plurality of labels, the second plurality of documents, and the second plurality of labels; and
hosting the ML model within the multi-tenant provider network in association with an endpoint;
receiving an inference request at the endpoint;
generating, by the ML model, an inference based on the inference request; and
transmitting the inference to a client application or to a storage location.

2. The computer-implemented method of claim 1, wherein generating the second plurality of documents and the second plurality of labels comprises:
selecting a document from the repository of documents;
generating a first perplexity score for the document using a first ML model;
generating a second perplexity score for the document using a second ML model; and
determining that the document is to be included within the second plurality of documents based at least in part on an analysis of a difference between the first perplexity score and the second perplexity score.

3. The computer-implemented method of claim 2, wherein determining that the document is to be included within the second plurality of documents comprises:
generating a first similarity value, comprising generating a first one or more similarity values between one or more pairs of embeddings corresponding to one or more pairs of documents from the first plurality of documents;
generating an embedding for the document;
generating a second similarity value, comprising generating a second one or more similarity metrics between the embedding and one or more embeddings corresponding to one or more documents from the first plurality of documents; and
determining that the second similarity value is within a threshold distance from the first similarity value.

4. A computer-implemented method comprising:
receiving, from a computing device of a user, a first plurality of documents and a first plurality of labels;
obtaining a second plurality of documents and a second plurality of labels based at least in part on the first plurality of documents, the first plurality of labels, and a repository of documents, wherein at least one document of the second plurality of documents does not exist within both the first plurality of documents and the repository of documents;
training a machine learning (ML) model using a training dataset comprising at least the first plurality of documents, the first plurality of labels, the second plurality of documents, and the second plurality of labels;
generating, by the ML model, an inference for a classification job or an entity detection job on behalf of a client application; and
transmitting the inference to the client application or to a storage location.

5. The computer-implemented method of claim 4, wherein generating obtaining the second plurality of documents and the second plurality of labels comprises:
selecting a document from the repository of documents;
generating a first perplexity score for the document using a first ML model;
generating a second perplexity score for the document using a second ML model; and
determining that the document is to be included within the second plurality of documents based at least in part on an analysis of a difference between the first perplexity score and the second perplexity score.

6. The computer-implemented method of claim 5, wherein:
the first ML model is a general-purpose natural language processing (NLP) model; and
the second ML model is an NLP model that was trained using at least the first plurality of documents.

7. The computer-implemented method of claim 5, wherein determining that the document is to be included within the second plurality of documents comprises:
generating a first similarity value, comprising generating a first one or more similarity values between one or more pairs of embeddings corresponding to one or more pairs of documents from the first plurality of documents;
generating an embedding for the document;
generating a second similarity value, comprising generating a second one or more similarity metrics between the embedding and one or more embeddings corresponding to one or more documents from the first plurality of documents; and
determining that the second similarity value is within a threshold distance from the first similarity value.

8. The computer-implemented method of claim 4, wherein obtaining the second plurality of documents comprises:
identifying, within the repository of documents, a document either including a first of the first plurality of labels that corresponds to a first document of the first plurality of documents or having a corresponding label that is the same as the first label, wherein the document and the first document belong to different domains; and
including the document within the second plurality of documents.

9. The computer-implemented method of claim 4, wherein obtaining the second plurality of documents comprises:
projecting a plurality of documents of the repository of documents into a common embedding space with a corresponding plurality of labels;

projecting at least the first plurality of labels into the common embedding space; and selecting one or more of the plurality of documents based on an analysis of embeddings within the common embedding space.

10. The computer-implemented method of claim 4, wherein obtaining the second plurality of documents comprises:

replacing at least a first value at a slot within a document of the first plurality of documents with a second value based at least in part on a semantic similarity between embeddings of the first value and second value, wherein the slot corresponds to a label of the first plurality of labels;

replacing one or more other values within the document, yielding a rewritten document; and determining that the rewritten document and at least the label are to be included within the second plurality of documents and the second plurality of labels, respectively, based on an analysis of the rewritten document.

11. The computer-implemented method of claim 4, wherein obtaining the second plurality of documents and the second plurality of labels comprises:

sending ones of the second plurality of documents to one or more annotators to solicit a selection, by the one or more annotators, of whether the corresponding document is associated with one or more of the first plurality of labels; and receiving, from the one or more annotators, annotations indicating the second plurality of labels for the second plurality of documents.

12. The computer-implemented method of claim 4, further comprising:

storing, by a storage service of a multi-tenant provider network, the first plurality of documents and the first plurality of labels at one or more storage locations;

receiving, by a language processing service of the multi-tenant provider network, a request originated by the computing device of the user to create a document classifier or an entity recognizer, the request identifying the one or more storage locations, wherein the computing device is located outside of the multi-tenant provider network; and obtaining, by the language processing service, the first plurality of documents and the first plurality of labels.

13. The computer-implemented method of claim 12, further comprising:

associating an endpoint, within a multi-tenant provider network, with the ML model; and sending an identifier of the endpoint to the computing device.

14. A system comprising:

a storage service implemented by a first one or more electronic devices of a multi-tenant provider network, the storage service to receive and store, from a computing device of a user, a first plurality of documents and a first plurality of labels; and a language processing service implemented by a second one or more electronic devices of the multi-tenant provider network, the language processing service including instructions that upon execution cause the language processing service to:

obtain the first plurality of documents and the first plurality of labels from the storage service;

obtain a second plurality of documents and a second plurality of labels based at least in part on the first plurality of documents, the first plurality of labels, and a repository of documents, wherein at least one document of the second plurality of documents does not exist within both the first plurality of documents and the repository of documents;

cause a machine learning (ML) model to be trained using a training dataset comprising at least the first plurality of documents, the first plurality of labels, the second plurality of documents, and the second plurality of labels; and cause the ML model to be deployed in association with an endpoint.

15. The system of claim 14, wherein to obtain the second plurality of documents and the second plurality of labels, the instructions upon execution further cause the language processing service to:

select a document from the repository of documents;

generate a first perplexity score for the document using a first ML model;

generate a second perplexity score for the document using a second ML model; and determine that the document is to be included within the second plurality of documents based at least in part on an analysis of a difference between the first perplexity score and the second perplexity score.

16. The system of claim 15, wherein to determine that the document is to be included within the second plurality of documents, the instructions upon execution further cause the language processing service to:

generate a first similarity value, comprising generating a first one or more similarity values between one or more pairs of embeddings corresponding to one or more pairs of documents from the first plurality of documents;

generate an embedding for the document;

generate a second similarity value, comprising generating a second one or more similarity metrics between the embedding and one or more embeddings corresponding to one or more documents from the first plurality of documents; and determine that the second similarity value is within a threshold distance from the first similarity value.

17. The system of claim 16, wherein the first ML model is a general-purpose natural language processing (NLP) model, and wherein the second ML model is an NLP model that was trained using at least the first plurality of documents.

18. The system of claim 14, wherein to obtain the second plurality of documents and the second plurality of labels, the instructions upon execution further cause the language processing service to:

project a plurality of documents of the repository of documents into a common embedding space with a corresponding plurality of labels;

project at least the first plurality of labels into the common embedding space; and select one or more of the plurality of documents based on an analysis of embeddings within the common embedding space.

19. The system of claim 14, wherein to obtain the second plurality of documents and the second plurality of labels, the instructions upon execution further cause the language processing service to:

replace at least a first value at a slot within a document of the first plurality of documents with a second value based at least in part on a semantic similarity between embeddings of the first value and second value, wherein the slot corresponds to a label of the first plurality of labels;

replace one or more other values within the document, yielding a rewritten document; and determine that the rewritten document and at least the label are to be included within the second plurality of documents and the second plurality of labels, respectively, based on an analysis of the rewritten document.

20. The system of claim 14, wherein to obtain the second plurality of documents and the second plurality of labels, the instructions upon execution further cause the language processing service to:

identify, within the repository of documents, a document either including a first of the first plurality of labels that corresponds to a first document of the first plurality of documents or having a corresponding label that is the same as the first label, wherein the document and the first document belong to different domains; and include the document within the second plurality of documents.

\* \* \* \* \*